(12) United States Patent
Ramachandran et al.

(10) Patent No.: US 10,734,782 B2
(45) Date of Patent: Aug. 4, 2020

(54) ULTRASHORT PULSE FIBER LASER EMPLOYING RAMAN SCATTERING IN HIGHER ORDER MODE FIBERS

(71) Applicant: Trustees of Boston University, Boston, MA (US)

(72) Inventors: Siddharth Ramachandran, Boston, MA (US); Lars Rishoj, Cambridge, MA (US); Jeffrey D. Demas, Somerville, MA (US)

(73) Assignee: Trustees of Boston University, Boston, MA (US)

(*) Notice: Subject to any disclaimer, the term of this patent is extended or adjusted under 35 U.S.C. 154(b) by 108 days.

(21) Appl. No.: 16/077,110

(22) PCT Filed: Feb. 13, 2017

(86) PCT No.: PCT/US2017/017645
§ 371 (c)(1),
(2) Date: Aug. 10, 2018

(87) PCT Pub. No.: WO2017/192196
PCT Pub. Date: Nov. 9, 2017

(65) Prior Publication Data
US 2019/0386451 A1 Dec. 19, 2019

Related U.S. Application Data

(60) Provisional application No. 62/294,565, filed on Feb. 12, 2016.

(51) Int. Cl.
*H01S 3/30* (2006.01)
*H01S 3/067* (2006.01)
(Continued)

(52) U.S. Cl.
CPC .......... *H01S 3/302* (2013.01); *H01S 3/06725* (2013.01); *H01S 3/0804* (2013.01);
(Continued)

(58) Field of Classification Search
CPC .................. H01S 3/06725; H01S 3/302; H01S 3/094076; H01S 3/06716; H01S 3/094046; H01S 3/0804; H01S 3/16; H01S 3/17
(Continued)

(56) References Cited

U.S. PATENT DOCUMENTS 7,257,293 B1 * 8/2007 Fini .......................... G02B 6/02
385/123
9,203,209 B2 * 12/2015 Ramachandran ..... H01S 3/0092
(Continued)

OTHER PUBLICATIONS

Bozinovic, Nenad et al. "Control of orbital angular momentum of light, with optical fibers." Boston University, Apr. 30, 2012, pp. 1-4.
(Continued)

*Primary Examiner* — Tuan N Nguyen
(74) *Attorney, Agent, or Firm* — BainwoodHuang

(57) ABSTRACT

A higher-order-mode (HOM) fiber of a fiber laser has step index and guidance diameter (GD) defining wavelength-dependent dispersion characteristics and effective areas for corresponding HOMS of optical signal propagation. One HOM has anomalous dispersion and effective area defining a first wavelength and first power of a pulse optical signal for conversion to a second wavelength and second power by soliton self-frequency shifting (SSFS). By controlling step index and GD, the dispersion and effective area of a HOM are adjusted to bring the second wavelength into a desired range, enabling applications requiring non-conventional fiber laser wavelengths. HOMS may share a predetermined group index and group velocity at wavelengths established by a Raman gain peak to effect wavelength conversion by
(Continued)

interpulse and intermodal Raman scattering, which may occur in a cascaded fashion to yield multicolor lasers with desired wavelengths, pulse energies and pulse widths.

29 Claims, 41 Drawing Sheets

(51) Int. Cl.
    *H01S 3/08*     (2006.01)
    *H01S 3/094*     (2006.01)
    *H01S 3/16*     (2006.01)
    *H01S 3/17*     (2006.01)

(52) U.S. Cl.
    CPC .. *H01S 3/094046* (2013.01); *H01S 3/094076* (2013.01); *H01S 3/06716* (2013.01); *H01S 3/1618* (2013.01); *H01S 3/171* (2013.01); *H01S 2301/085* (2013.01); *H01S 2303/00* (2013.01)

(58) Field of Classification Search
    USPC .......................................................... 372/3, 6
    See application file for complete search history.

(56) References Cited

U.S. PATENT DOCUMENTS

| | | |
|---|---|---|
| 2010/0100006 A1 | 4/2010 | Xu et al. |
| 2011/0069723 A1* | 3/2011 | Dong ................ H01S 3/06716 372/6 |
| 2012/0224597 A1 | 9/2012 | Jespersen et al. |
| 2013/0114129 A1 | 5/2013 | Alkeskjold |
| 2015/0188283 A1 | 7/2015 | Ramachandran |
| 2015/0192732 A1 | 7/2015 | Moselund |

OTHER PUBLICATIONS

Reeves, W.H. et al. "Transformation and control of ultrashort pulses in dispersion-engineered photonic crystal fibres." Nature vol. 424, Jul. 31, 2003, pp. 511-515.
Ramachandran, Siddharth et al. "Ultra-large effective-area, higher-order mode fibers: a new strategy for high-power lasers." Laser and Photonics Reviews, 2008, pp. 429-446.
X. Liu, et al., "Soliton self-frequency shift in a short tapered air-silica microstructure fiber," Opt. Lett, vol. 26, pp. 358-360, 2001.
J.V. Howe, et al. "Demonstration of soliton self-frequency shift below 1300 nm in higher-order-mode, solid silica-based fiber," Optics Lett., vol. 32, p. 340, 2007.
Pedersen, Martin EV, et al. "Higher-order-mode fiber optimized for energetic soliton propagation." Optics letters 37.16 (2012): 3459-3461.
Cheng, Ji, et al. "Intermodal Cerenkov radiation in a higher-order-mode fiber." Optics letters 37.21 (2012): 4410-4412.
J. Cheng, et al. "Intermodal four-wave mixing in a higher-order-mode fiber," Applied Physics Letters, vol. 101, No. 16, p. 161106, 2012.
Charan, Kriti, et al. "Experimental Demonstration of Soliton Cascade in Higher-Order-Mode Fibers." Photonics Technology Letters, IEEE 26.3 (2014): 301-304.
Demirhan Kobat, et al. "Deep tissue multiphoton microscopy using longer wavelength excitation," Opt. Express 17, 13354-13364 2009).
Non-Linear Fibres for Widely Tunable Femtosecond Fibre Lasers, PhD Thesis 2013, M.V. Pedersen.
Yuhong Yao, et al. "Yb:fiber laser-based, spectrally coherent and efficient generation of femtosecond 1.3-μm pulses from a fiber with two zero-dispersion wavelengths," Opt. Lett. 40,3631-3634 (2015).
Wang, Ke, et al. "Advanced fiber soliton sources for nonlinear deep tissue imaging in biophotonics." Selected Topics in Quantum Electronics, IEEE Journal of 20.2 (2014): 50-60.
Thomas Gottschall, et al. "Four-wave-mixing-based optical parametric oscillator delivering energetic, tunable, chirped femtosecond pulses for non-linear biomedical applications," Opt. Express 23, 23968-23977 (2015).
S. Ramachandran, et al. "Ultra-large effective-area, higher-order mode fibers: a new strategy for high-power lasers," Laser Photon. Rev. 2, 429-448 (2008).
S. Ramachandran,et al. "Light propagation with ultralarge modal areas in optical fibers," Opt. Lett. 31, 1797-1799 (2006).
P. Steinvurzel, et al. "Broadband parametric wavelength conversion at 1 μm with large mode area fibers," Optics Letters, vol. 39, p. 743, 2014.
N. Bozinovic, et al. "Terabit-Scale Orbital Angular Momentum Mode Division Multiplexing in Fibers," Science vol. 340 (6140), p. 1545, 2013.
S. Ramachandran et al. "Optical vortices in fiber," Invited Paper, J. Nanophotonics vol. 2, p. 455,2013.
P. Gregg, et al. "Conservation of orbital angular momentum in air-core optical fibers," Optica vol. 2, p. 267, 2015.
S. Ramachandran, et al. "On the scalability of ring fiber designs for OAM multiplexing," Invited Paper, Opt. Exp. vol. 23, p. 3721, 2015.

* cited by examiner

ULTRASHORT PULSE FIBER LASER EMPLOYING RAMAN SCATTERING IN HIGHER ORDER MODE FIBERS

GOVERNMENT RIGHTS

This invention was made with Government support under Contract No. EY026410 awarded by the National Institutes of Health and Contract No. FA9550-14-1-0165 awarded by the Air Force Office of Scientific Research. The Government has certain rights in the invention.

BACKGROUND

The present invention is related to the field of fiber lasers.

Generation of ultrafast, high-energy, high repetition-rate laser pulses in a variety of wavelength ranges is of interest in multiple applications. For instance, multiphoton microscopy, commonly used for deep tissue brain imaging, requires sources at wavelengths where fluorophores are available. Desirable operation is achieved using an excitation source having a wavelength in either of two tissue transparency windows at approximately 1300 and 1700 nm. In other applications, such as trace gas sensing, accelerator applications, and machining applications, ultrafast, energetic near-infrared or mid-infrared sources may be required or desirable. These applications may require peak pulse powers at megawatt (MW) levels. Additionally, high repetition-rate may signify sources that emit pulses at the rates of 100 kHz or more.

A fiber laser may be realized using a gain medium that emits photons at a desired color (wavelength). Most common gain media that can be incorporated in optical fibers are realized using rare earth dopants, such as Ytterbium (in the 1000 nm range), Erbium (in the 1550 nm region), or Thulium (in the 2000 nm range). Fiber-based lasers offer tremendous opportunities and have been successfully deployed in a variety of applications.

SUMMARY

Due to a lack of laser gain media at other wavelengths, high energy ultrashort pulse fiber lasers have generally been restricted to operation in the above three specific wavelength regions (1000 nm, 1550 nm, and 2000 nm). For greater use of fiber lasers in broader applications as described above, there is a need for techniques to generate ultrafast, high repetition-rate, energetic pulses in a variety of hard-to-access wavelength ranges. These include wavelengths in the near-IR (generally about 700 to 2000 nm) as well as the mid-IR (generally greater than about 2000 nm). Specific ranges of interest may include 700-1000 nm, ~1300 nm (e.g., 1200-1400 nm), ~1700 nm (e.g., 1600-1800 nm), and even longer wavelengths such as 2-10 μm.

In one aspect, a fiber laser is disclosed that includes a higher-order-mode (HOM) fiber, having a step index and a guidance diameter, that supports multiple modes of optical signal propagation, each mode has a respective wavelength-dependent dispersion characteristics and effective areas greater than 100 square micrometers. The higher-order modes include a predetermined higher-order mode with corresponding anomalous dispersion characteristic and effective area, and a first wavelength and first power of a pulse optical signal is converted to a second wavelength and second power by soliton self-frequency shifting (SSFS) in the HOM fiber. The second wavelength and second power are related to the first wavelength and first power by the anomalous dispersion characteristic and effective area for the predetermined higher-order mode. The fiber laser further includes a source subsystem coupled to the HOM fiber to establish the pulse optical signal propagating in the HOM fiber in the predetermined higher-order mode. Based on the tunability of the dispersion characteristic and effective area for the higher-order mode, the second wavelength may be shifted into a desired range even while the first wavelength is away from that range, and thus the laser may be used in applications requiring non-conventional fiber laser wavelengths.

In another aspect, a fiber laser is disclosed that includes a higher-order-mode (HOM) fiber, having a step index and a guidance diameter, that supports multiple modes of optical signal propagation, each mode has a respective wavelength-dependent dispersion, group index, and effective area characteristics. The higher-order modes include predetermined first and second modes sharing a predetermined group index (or group velocity) at corresponding first and second wavelengths to define a first pulse optical signal having the first mode and first wavelength from which a second pulse optical signal of the second mode and second wavelength is produced by interpulse and intermodal Raman scattering. A source subsystem is coupled to the HOM fiber to establish the first optical signal propagating in the first mode to produce the second optical signal. The predetermined wavelength difference between the first and second wavelengths are similar or close to the peak of the Raman gain coefficient with respect to the first wavelength. The conversion process may have a cascaded aspect in which each converted signal serves as a pump or initiator for a next converted signal having a next separated wavelength, and thus a greater range of tunability may be realized compared to SSFS.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
FIG. 1 is a block diagram of a fiber laser system.

As mentioned, generation of ultrafast, high-energy, high repetition-rate laser pulses in a variety of wavelength ranges is of interest in many applications. For biological applications such as deep tissue brain imaging, ideal operation may be achieved using an excitation source in either of two tissue transparency windows at approximately 1300 and 1700 nm. Alternatively, ultrafast, energetic near-infrared or mid-infrared sources may be of interest in applications such as (1) trace gas sensing for homeland security as well as environment monitoring applications; (2) accelerator applications such as high harmonic generation, proton and ion beam generation via gas jets, and advanced concepts for dielectric laser accelerators; and (3) machining applications such as heart stent manufacturing.

In this context, ultrashort typically denotes pulses with temporal widths of 300 femtoseconds or less, and energetic pulses usually have energies greater than 1 nano-joule (nJ) and up to a 1 micro joule (μJ). Thus, peak powers in these pulses approach, and even exceed, megawatt (MW) levels. Finally, high repetition-rate usually signifies sources that emit pulses at the rates of 100 kHz or more. Given the variety of applications, it is especially useful to realize laser sources that could provide wavelength tunable outputs that cover part of or entire desired spectral range, including the near-IR and mid-IR ranges mentioned above.

One approach of obtaining a fiber laser at a desired wavelength is to start with a conventional doped fiber lasers as a pump laser and then convert the light to a desired wavelength via a nonlinear process in the fiber. Generally, an optical pulse traveling through a medium will experience dispersion, causing the pulse to temporally broaden, meaning that different frequencies propagates at different velocities. If the aim is to generate an ultrafast source and as most pulses broaden in time due to material dispersion in fibers, it is sensible to utilize a special pulse solution referred to as a soliton. This is a stable pulse solution that remains transform limited (i.e., it maintains its shape and does not spread in time) as it propagates through the fiber. Technically, a soliton is a pulse whose product between its temporal and spectral widths remains constant during propagation. A soliton arises as a balance between the linear effect of anomalous dispersion and the nonlinear effect of self-phase modulation. Furthermore, the effect of Raman scattering in the fiber leads to a continuous shift of the center wavelength of the pulse towards longer wavelengths, as phonon interaction causes a continuous transfer of energy from the short wavelengths of the pulse to the longer wavelengths.

As an example, a fiber laser generating light at 1300 nm may be realized by forming a soliton at 10xx nm, using an ytterbium fiber laser as a pump at an input end of the fiber, and obtaining an ultrafast pulse at 1300 nm at the output of the fiber by controlling either or both the length of propagation in the fiber or the input pulse energy. This process is known as soliton self-frequency shifting (SSFS). In addition, as the soliton shifts to longer wavelengths it simultaneously transfers energy via a process of Cherenkov radiation typically to a wavelength shorter than the pump wavelength. Hence, nonlinear processes with an ultrafast pump input in a fiber can be used to generate light at both longer and shorter wavelengths relative to the pump wavelength. Light at longer wavelengths remains a soliton and thus transform limited, while a Cherenkov radiation mediated pulse disperses or spreads in time, so applications using this part of the generated spectrum may require external pulse compression using, for example, dispersive devices.

FIG. 1 shows a laser system in high-level schematic form. It includes a source subsystem 10, a higher-order mode (HOM) fiber 12, and an output subsystem 14. In operation, the source subsystem 10 establishes an optical signal within the fiber 12, and the signal undergoes conversion in a manner described herein to generate a converted optical signal within the fiber 12. This input optical signal is in some cases referred to as a "pump" signal, generated by a pump source of the source subsystem 10. Several specific examples are described below. The converted optical signal may itself exit the fiber 12 as an output optical signal, or it may undergo other process(es) within the fiber 12 to generate the ultimate output optical signal, which is provided to the output subsystem 14 for further optical conditioning and use. Given the use of higher-order modes within the fiber 12 as described herein, the output subsystem 14 in many cases includes components for extracting or otherwise processing one or more specific higher-order modes.

Soliton generation and propagation require that the utilized mode of fiber 12 exhibit anomalous dispersion (i.e., dispersion D>0). Thus, typical single moded silica glass fibers may not be used at wavelengths below 1300 nm, where they typically exhibit normal dispersion D<0. Furthermore, the energy of the soliton is proportional to both the dispersion and the effective area of the optical fiber mode, and also the spectral bandwidth of the soliton:

$$E_{sol} \alpha\ D\ A_{eff} \Delta\lambda \tag{1}$$

Anomalous dispersion at ~1 um can be achieved using high-confinement-geometry quasi-single-moded fibers, such as photonic crystal fibers (PCF). However, there is a trade-off between dispersion and effective area, since in order to increase dispersion (and obtain D>0) the effective area must be decreased. This trade-off has limited the energy of wavelength-shifted solitons pulses at 1300 nm to less than 1 nJ. In general PCFs are inoperable at high powers, because the in-fiber intensities would be too high and cause pulse break up, material damage, etc. Other SSFS-based approaches have employed special waveguide designs that yield anomalous dispersion using the $LP_{02}$ mode in a fiber, over a very narrow range. However, pulse energies in these approaches have not exceeded a few nJ, because the aforementioned dispersion-vs-mode-area trade-off is only slightly relaxed.

This description presents a solution to this longstanding problem based on using SSFS in a class of fibers in which mode-areas can be orders of magnitude larger than in PCF, while still achieving high anomalous dispersion values for a variety of wavelength ranges. One key aspect of this approach is the realization that higher order modes (HOMs) have dispersion zeros that shift to shorter wavelengths as mode order is increased. Thus, the size of the waveguide, which controls mode area and hence power-handling capability, may be designed independent of where the dispersion-zero lies.

The HOM fiber 12 may belong to either of two broad classes supporting corresponding types of modes. A first type are modes that resemble free-space Bessel beams, also called $LP_{0,m}$ modes, where m stands for radial order. Such modes are stable to bend perturbations in a step index fiber, and hence very scalable in mode area. Their mode-dependent dispersion property has been used to realize nanosecond lasers using four-wave mixing, for example. The second type are modes that carry orbital angular momentum (OAM), which may be stable in fibers that are even km long. Such modes may have multiple radial orders, though their main characteristic is the existence of helical phase that, for a beam with OAM of order L, represents L phase wraps around the beam. In analogy with the $LP_{0,m}$ modes in a fiber, the dispersion-zero of these OAM modes also shifts to lower wavelengths as mode order L is increased.

Figure 2:
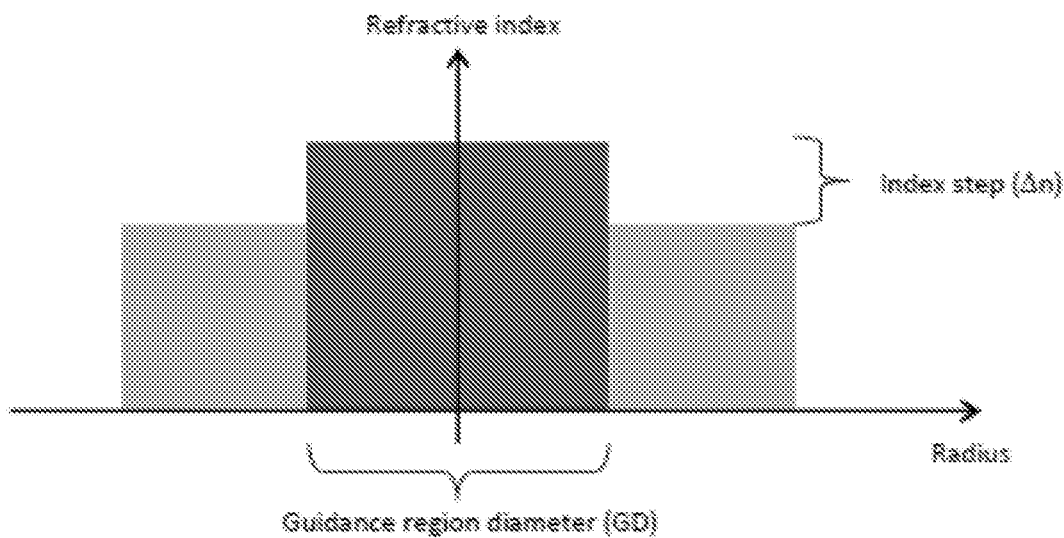
FIG. 2 is a schematic diagram of a refractive index profile of a HOM fiber supporting $LP_{0,m}$ modes.

FIG. 2 provides a general schematic of a refractive index profile of a HOM fiber supporting $LP_{0,m}$ modes. While a single index step is illustrated, in general multiple index steps may be used. Important fiber design parameters are the size of the index step and the diameter of the HOM guidance region, referred to as "guidance diameter" or GD. The guidance region may be defined by adding dopants, e.g. adding germanium to increase the refractive index, or fluorine to decrease the index with respect to silica. The guidance region could also be defined in multiple other ways as described further below. The GD diameter of the guidance region could be anywhere between tens of microns up to several hundreds of microns, leading to effective areas of the modes of over 6000 $\mu m^2$.

Figure 3:
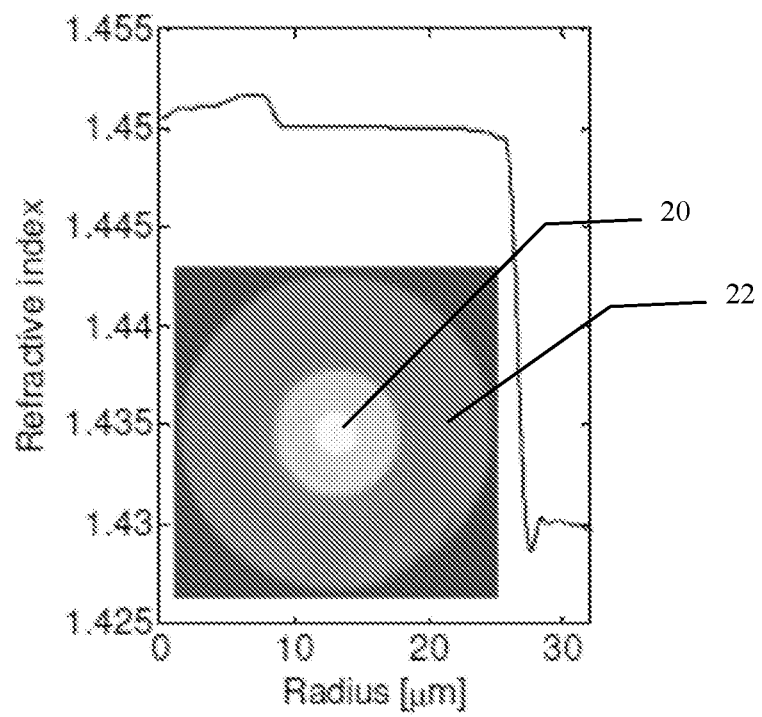
FIG. 3 shows an alternative fiber with a double cladding structure and multiple guidance regions.

FIG. 3 shows an alternative fiber with a double cladding structure (two index steps) and thus multiple guidance regions. In this example the HOM fiber has a single moded core 20 up to 7 μm of radius, and a HOM guidance region 22 with GD of about 50 μm. The inset shows the fiber face, with the different shades indicating the different index regions of the fiber, e.g., core and cladding. Characteristics of operation of this type of fiber are included in the description below. The single moded core can be made UV sensitive allowing for inscriptions of long period gratings (LPGs), which will be discussed further below.

Figure 4A:
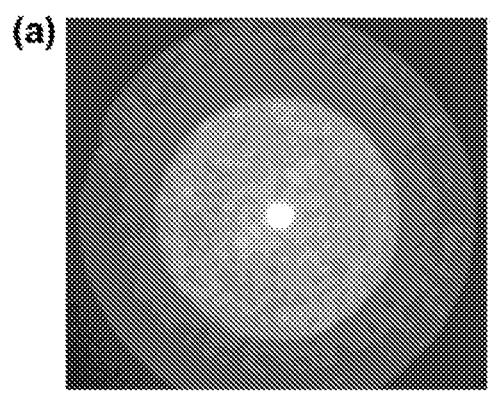
FIGS. 4A and 4B illustrate another fiber having a guidance region diameter of 84 μm and refractive index profile as shown.
Figure 4B:
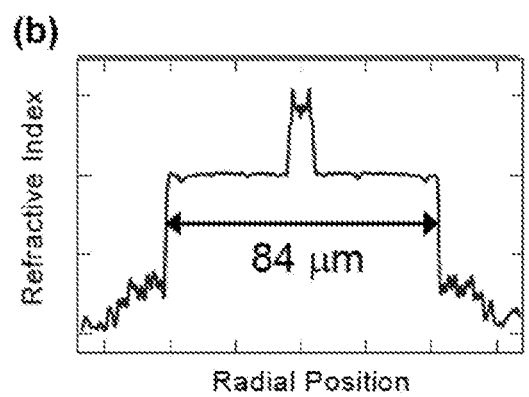

FIGS. 4A and 4B illustrate another fiber having a guidance region diameter of 84 μm and refractive index profile as shown. Other description below may be based on this fiber, as well as on a fiber having a GD of 105 μm. In this fiber as well as that of FIG. 3, the guidance region is defined using dopants in silica glass.

Figure 5A:
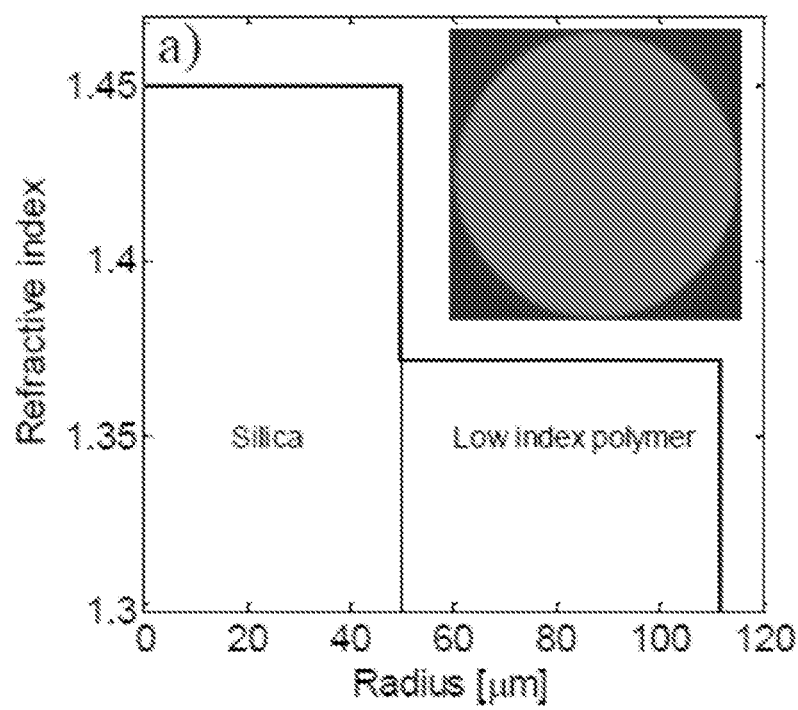
FIGS. 5A and 5B illustrate an example HOM fiber in which the guidance region is defined by low index polymer.
Figure 5B:
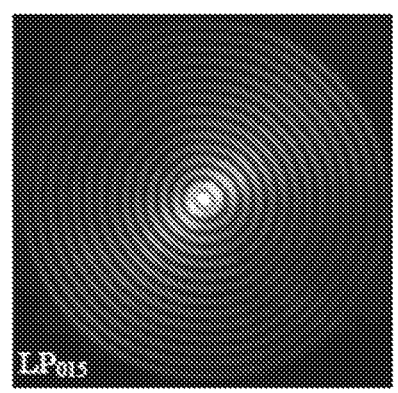

FIGS. 5A and 5B illustrate an example HOM fiber in which the guidance region is defined by low index polymer, providing for a higher index step. FIG. 5B shows a propagated $LP_{0,15}$ mode in this fiber.

Figure 6:
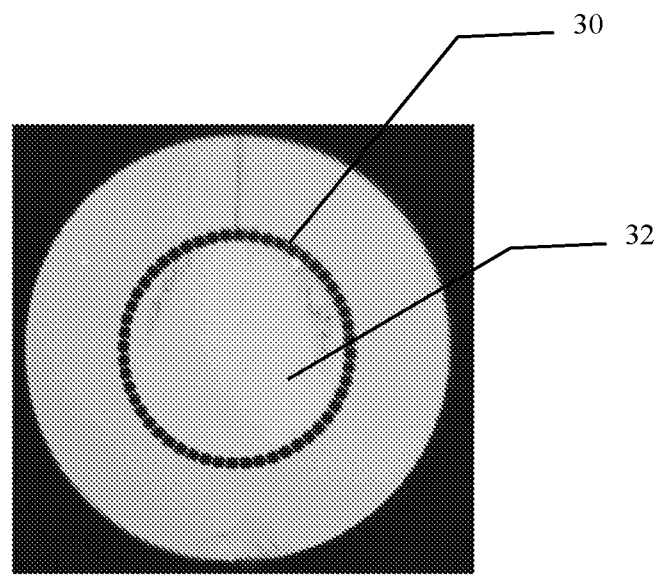
FIG. 6 illustrates an alternative in which the guidance region is defined by a ring of airholes.

FIG. 6 illustrates an alternative in which the guidance region is defined by a ring of airholes 30. The fiber may be all silica except for the ring of air holes 30 that continue along the length of the fiber. The guidance region is defined as the region 32 inside the ring of airholes. As the refractive index of air is 1, this leads to a large index step, which relates to the number of modes guided in the fiber (higher index step leads to more modes).

Figure 7:
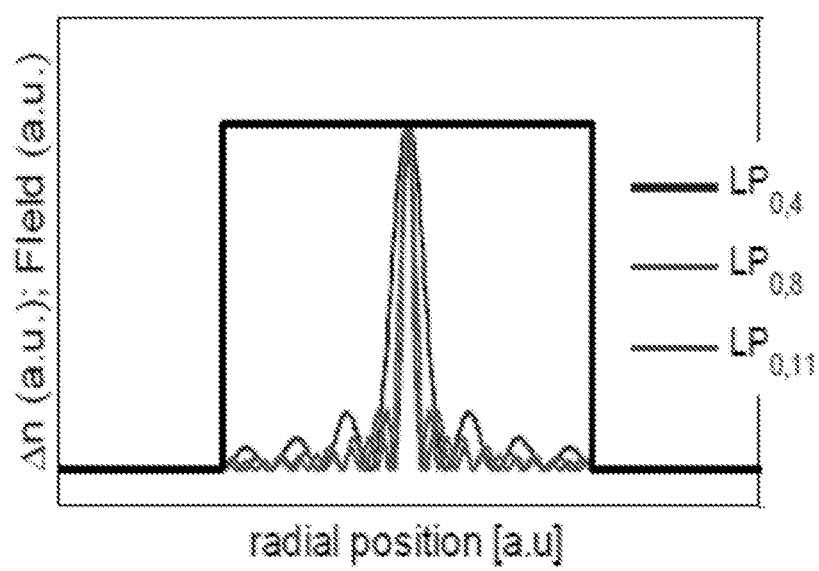
FIG. 7 shows index profile for a fiber using non-silica material, for mid-IR wavelength operation.

FIG. 7 shows an example fiber using an alternative material (not silica), which might facilitate guidance in other spectral regions. In this example, a mid-IR fiber is envisaged with chalcogenide glasses—$As_2Se_3$ (Arsenic triselenide, refractive index of 2.8) in the core and $As_2S_3$ in the cladding (Arsenic trisulfide, refractive index of 2.4), and with a core diameter of ~30 μm. This material composition provides transparency in the 1 μm to 10 μm wavelength regime. FIG. 7 also shows simulated intensity profiles of selected guided modes in this fiber—the $LP_{0,4}$, $LP_{0,8}$, and $LP_{0,11}$ modes.

Figure 8A:
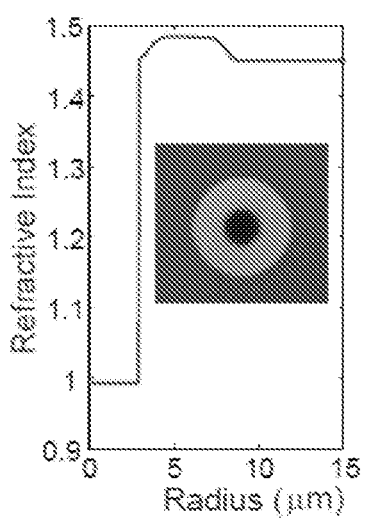
FIGS. 8A and 8B show an example of a fiber that can be used for guiding OAM modes.
Figure 8B:
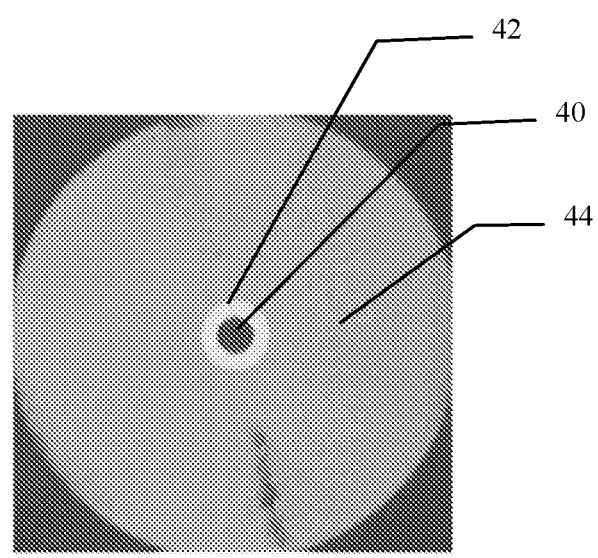

FIGS. 8A and 8B show an example of a fiber that can be used for guiding OAM modes. These fibers typically have a guidance region defined by a high index ring. To ensure stable OAM mode propagation, a large index step is required at either the outer or inner boundary of this ring. In the image of FIG. 8B, a central air region 40 is surrounded by a high-index doped region 42, which is surrounded by a pure silica region 44. Alternatively, it is possible to ensure stable OAM guidance in a fiber without an airhole region and instead by high index up and down-dopants alone.

As described above, the use of HOMs in a fiber enable dispersion and mode-area to be independently tailored. And as shown from eq. (1) above, obtaining high energy soliton pulses requires high dispersion and large effective area.

Figure 9A:
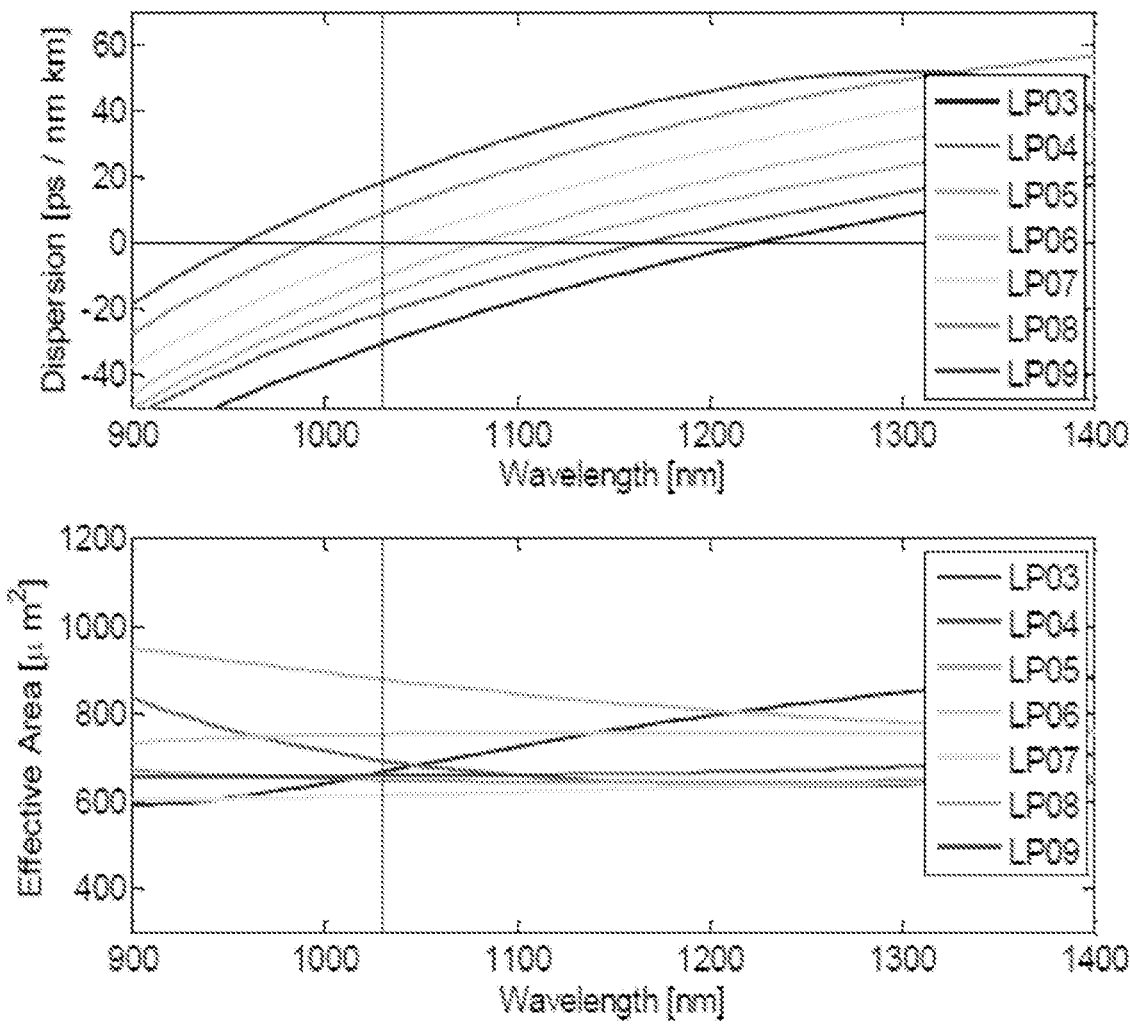
FIG. 9A shows plots of dispersion and effective area (respectively) versus wavelengths for a number of $LP_{0,m}$ modes.
Figure 9B:
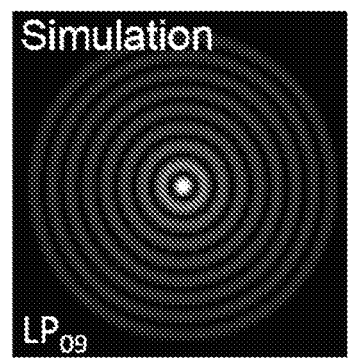
FIG. 9B shows an example of the spatial intensity distribution of the $LP_{09}$ mode.

FIG. 9A shows plots of dispersion and effective area (respectively) versus wavelengths for a number of $LP_{0,m}$ modes, based on the refractive index profile shown in FIG. 3. In the dispersion curves at top, it can be seen that dispersion value generally increases with increasing mode order, which naturally leads to the fact that the zero dispersion wavelength (ZDW) (the wavelength for which the dispersion is zero) decreases with increasing mode order. The noteworthy feature is that by using a higher mode order it is possible to obtain anomalous dispersion (D>0) for wavelengths less than ~1300 nm, which is the ZDW for bulk silica. And, unlike for PCFs, this is obtained along with large effective areas as seen from the effective area curves at bottom, which shows that the effective areas for all modes is generally larger than 600 $\mu m^2$ for all wavelengths. FIG. 9B provides an example of a spatial intensity distribution of the $LP_{0,9}$ mode. The distribution has a single center spot and eight surrounding concentric rings.

Figure 10A:
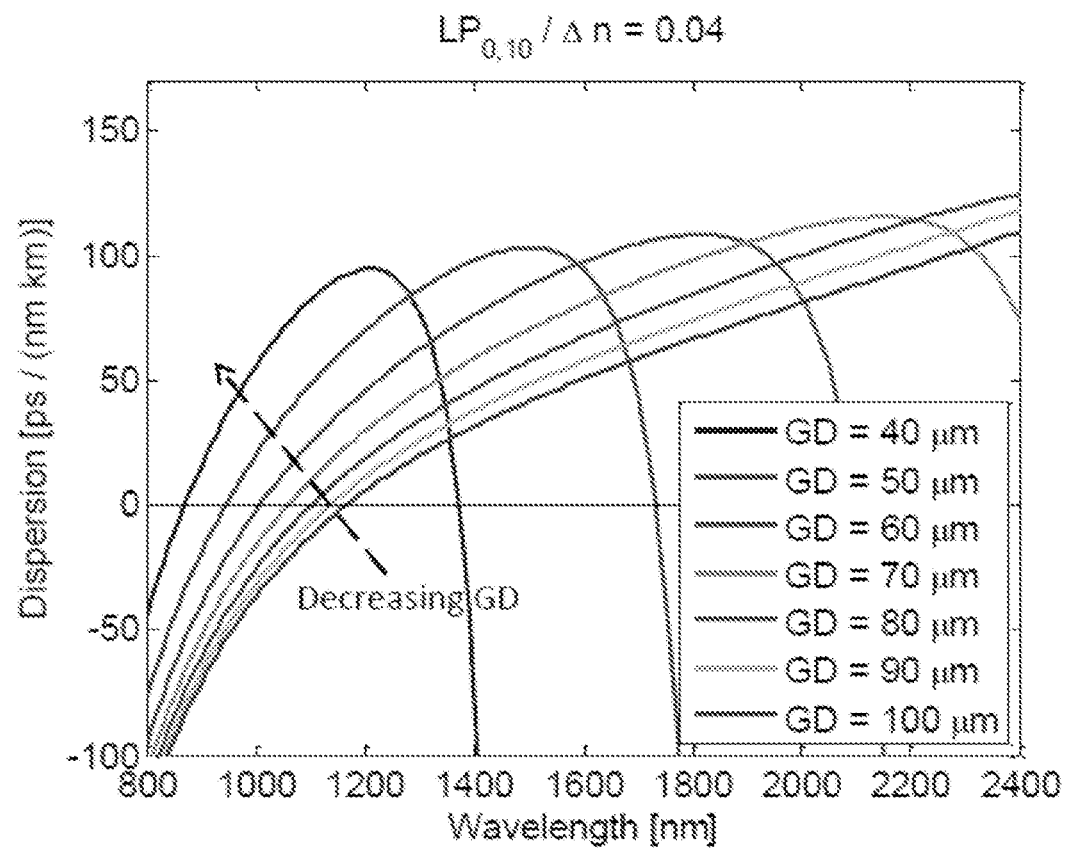
FIGS. 10A and 10B shows dispersion curves for a single mode for different combinations of guidance diameter and index step.
Figure 10B:
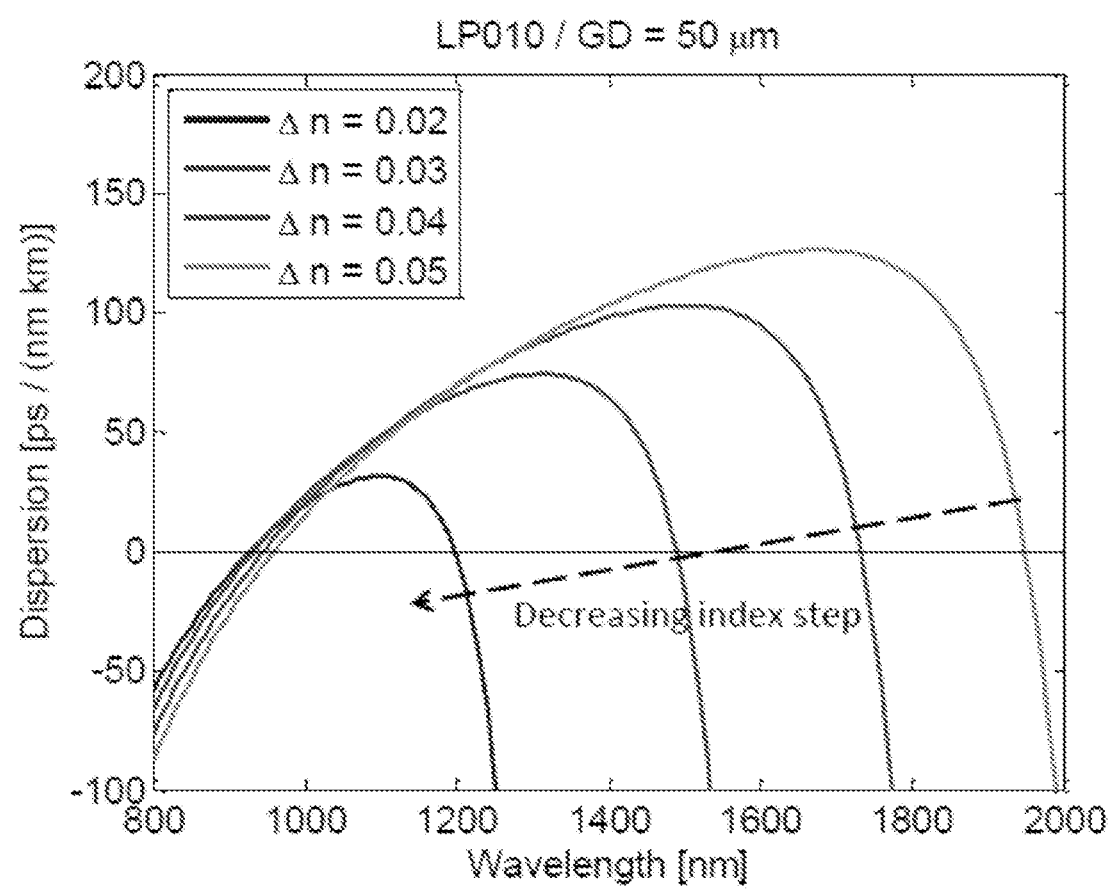

FIGS. 10A and 10B illustrate that the dispersion curve of a single mode, in this example the $LP_{0,10}$ mode, can be tailored by fiber design. These examples use the fiber profile of FIG. 2. FIG. 10A shows guidance diameter being altered while keeping the index step fixed, while FIG. 10B illustrates the index step being altered for fixed guidance diameter. The exact shape of the dispersion curve will impact the soliton dynamics, so this ability to tailor the dispersion curve can be used to obtain specific desired performance. Using a combination of these two parameters (GD and index step) and furthermore by mode selection it is possible to obtain almost any desired dispersion profile.

Figures 11A, 11B:
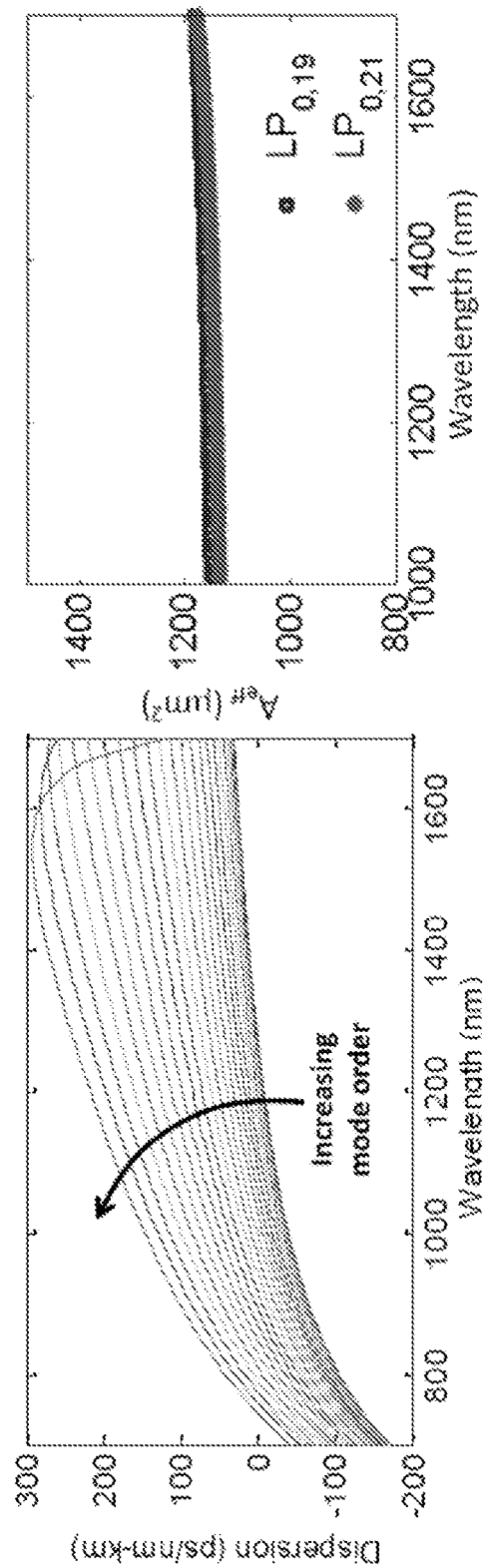
FIGS. 11A and 11B illustrate dispersion versus wavelength and effective area versus wavelength for selected modes in a fiber having a guidance region of 84 μm.

FIGS. 11A and 11B illustrate dispersion versus wavelength and effective area versus wavelength for selected modes in a fiber having a guidance region of 84 $\mu m$. These characteristics are based on the fiber profile of FIGS. 4A and 4B. It may be noticed that the dispersion curves are similar to those shown in FIGS. 9A and 9B for a fiber in which the GD is 50 $\mu m$, however, the effective areas are over 1100 $\mu m^2$, as opposed to 600 $\mu m^2$. Thus, by increasing the guidance diameter it is possible to increase the effective area of the supported modes in the fiber, while still obtaining a similar dispersion curves. In additional examples below, the effective area of the modes may exceed 1600 $\mu m^2$. Stable propagation of $LP_{0,m}$ modes with areas over 6000 $\mu m^2$ have been demonstrated. As seen from eq. (1), increasing area is one way to scale the soliton energy.

Figure 12:
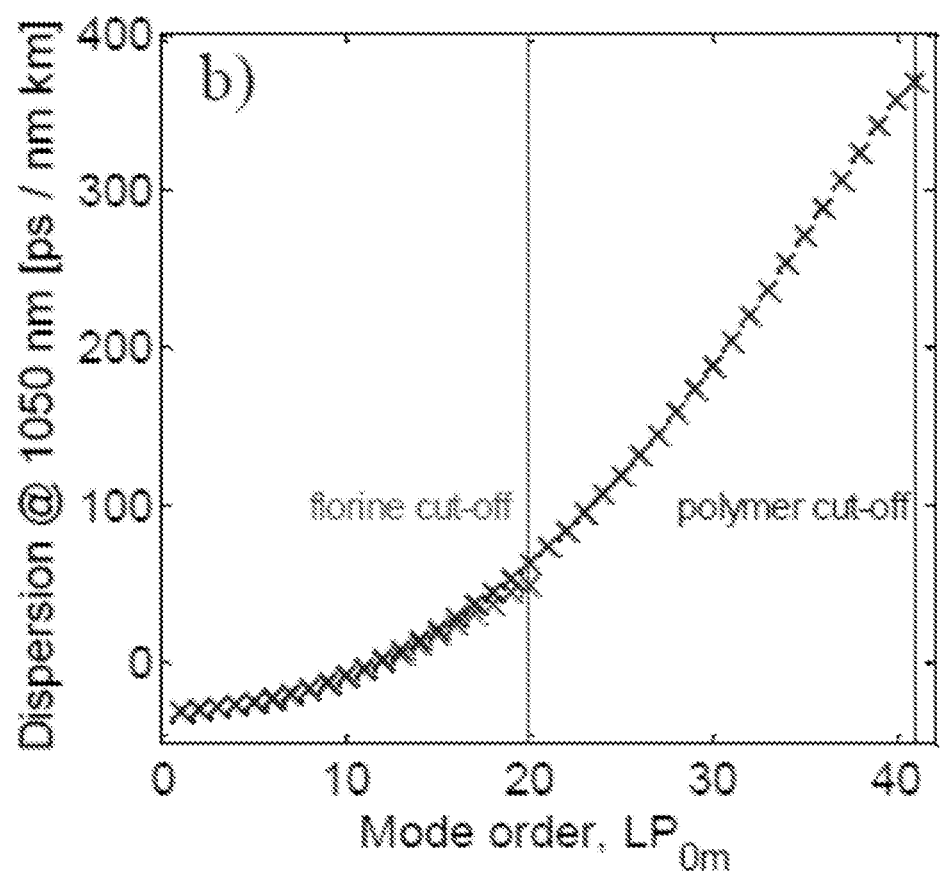
FIG. 12 is a plot of dispersion versus mode order at a wavelength of 1050 nm for two different fiber types.

FIG. 12 is a plot of dispersion versus mode order at a wavelength of 1050 nm for two different fiber types. As seen from eq. (1), another way to increase the soliton energy is by increasing the dispersion. Dispersion increases with mode order, and fibers having higher index steps generally support higher order modes. Thus, another way of scaling soliton pulse energy in HOM fibers is to increase the index step. FIG. 12 illustrates dispersion characteristics for two different fibers. The longer curve is for a low-index polymer fiber such as that of FIG. 5, showing that dispersion greater than 200 ps/nm-km can be achieved for mode orders higher than about $LP_{0,30}$. This is contrasted with an analogous fiber having an index step only one fourth the magnitude (obtainable using fluorine dopants in all-glass fiber), where dispersion is limited to about 70 ps/nm-km for a mode order of $LP_{0,20}$.

Figure 13:
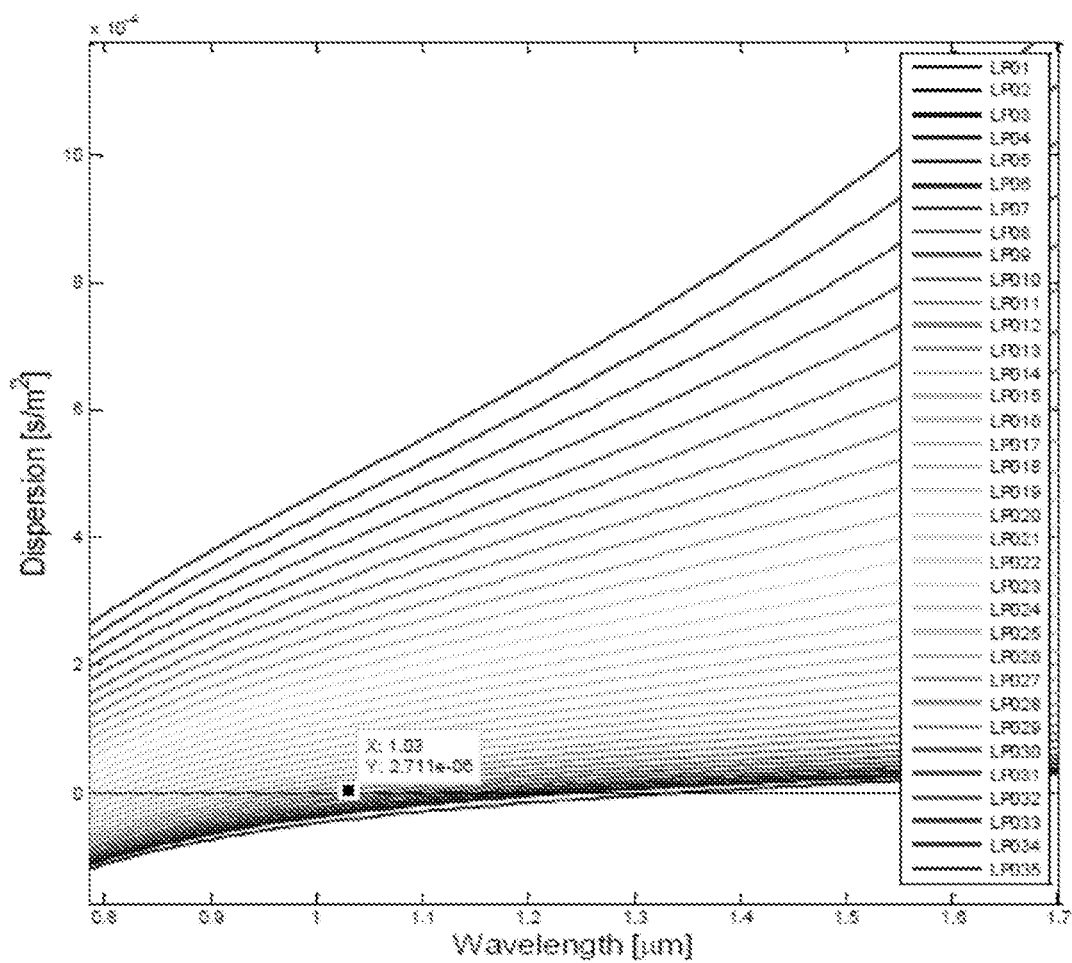
FIG. 13 illustrates dispersion curves for a fiber such as that of FIG. 6 in which a large index step is obtained by surrounding the guidance region with a ring of low index air holes.

FIG. 13 illustrates dispersion curves for a fiber such as that of FIG. 6 in which a large index step is obtained by surrounding the guidance region with a ring of low index air holes. It can be seen that many modes are guided and that very high dispersion values can be obtained.

Figures 14A, 14B:
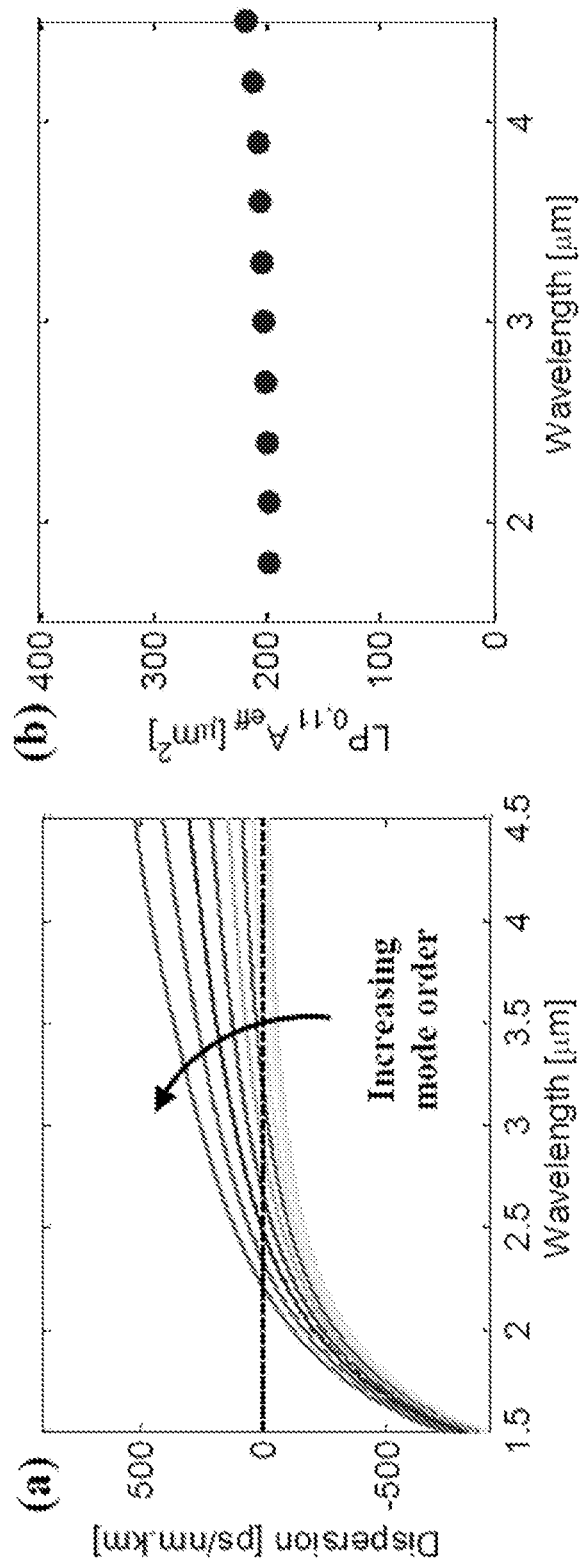
FIGS. 14A and 14B show dispersion and effective area for the fiber of FIG. 7.

FIGS. 14A and 14B show dispersion and effective area for the fiber of FIG. 7, which operates in the mid-IR wavelength regime. For these fibers based on chalcogenide glasses, the ZDW is about 4 (as seen from the bottom-most curve on the left plot). Using HOMs, anomalous dispersion (and thus soliton operation) can be obtained at shorter wavelengths. For the top-most curve, for example, the ZDW is at about ~2.2 $\mu m$. The concept is similar to that discussed above for silica fibers, except that for silica the ZDW is on the order of 1300 nm. The plot at right shows effective area versus wavelength for the $LP_{0,11}$ mode, showing that the effective area is above 200 $\mu m^2$ for this wavelength regime.

As mentioned above with reference to FIG. 8, another class of HOMs are the OAM modes. The intensity distributions of these modes consist of one ring or several concentric rings but without any center spot. Their main characteristic is the existence of helical phase that, for a beam with OAM of order L, represents L phase wraps around the beam.

Figure 15:
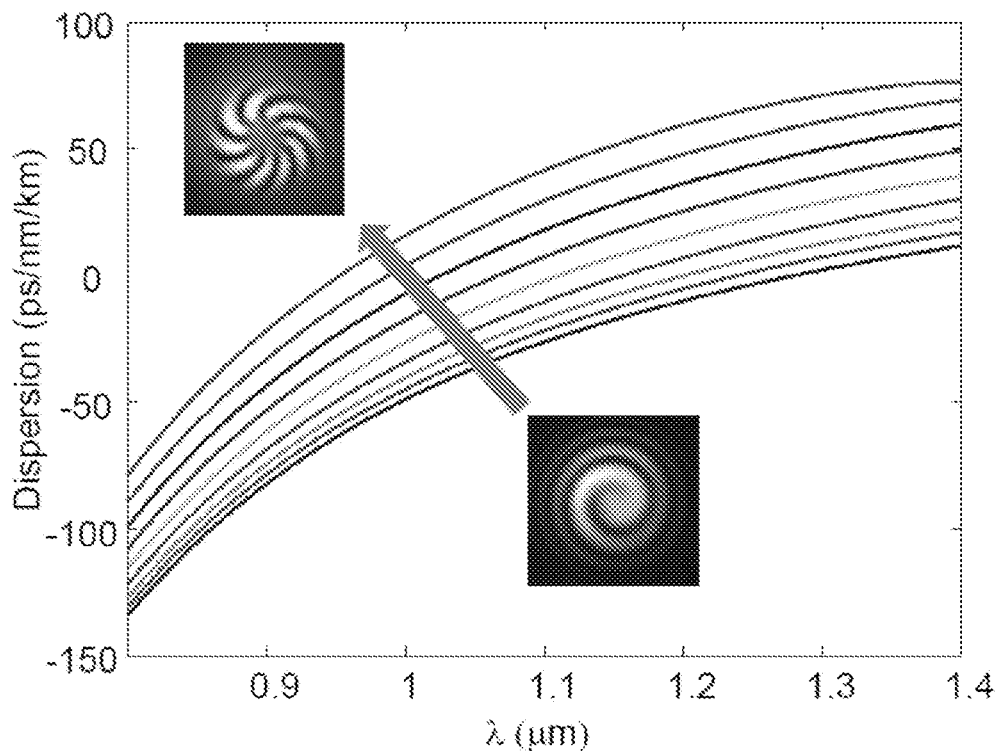
FIG. 15 presents a simulation of the dispersive characteristics of OAM modes versus wavelength for a fiber such as that of FIG. 8.

FIG. 15 presents a simulation of the dispersive characteristics of OAM modes versus wavelength for a fiber such as that of FIG. 8. Notice that the dispersion increases with increasing mode order L (and thus ZDW decreases). The insets show the spiral patterns of the modes, obtained by interfering a given OAM mode and a Gaussian beam. More spiral arms indicate higher L.

Figure 16:
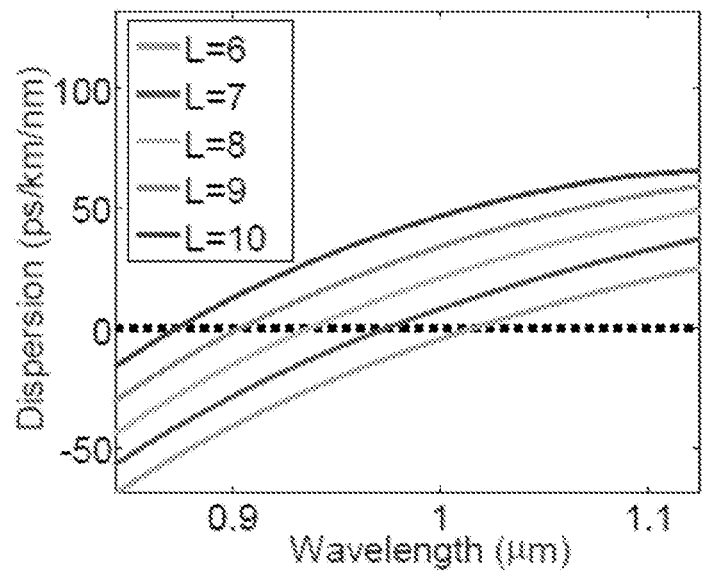
FIG. 16 shows a more detailed view for OAM modes L=6 through L=10.

FIG. 16 shows a more detailed view for OAM modes L=6 through L=10.

The description now turns to important aspects of operation, primarily with reference to systems employing $LP_{0,m}$ modes as illustrative examples. Those skilled in the art will appreciate that similar aspects can be realized in systems using OAM modes. Datasets described below illustrate high energy and high peak power soliton self-frequency shifting (SSFS), which is enabled by the use of HOMs.

Figure 17:
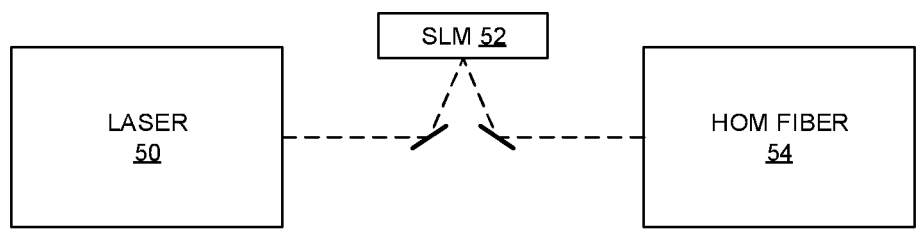
FIG. 17 shows a system arrangement.

FIG. 17 shows a system arrangement having a 1030-nm pump laser 50 is used that emits 370 fs pulses at a 120 kHz rep. rate. A spatial light modulator (SLM) 52 encodes the spatial phase information on the Gaussian output beam of the laser 50 and thereby controls which specific mode is launched in the HOM fiber 54. FIG. 17 shows a general setup; alternative arrangements are given below. It should be noted that the laser 50 and SLM 52 can be viewed as one example of the source subsystem 10 of FIG. 1.

Figure 18A:
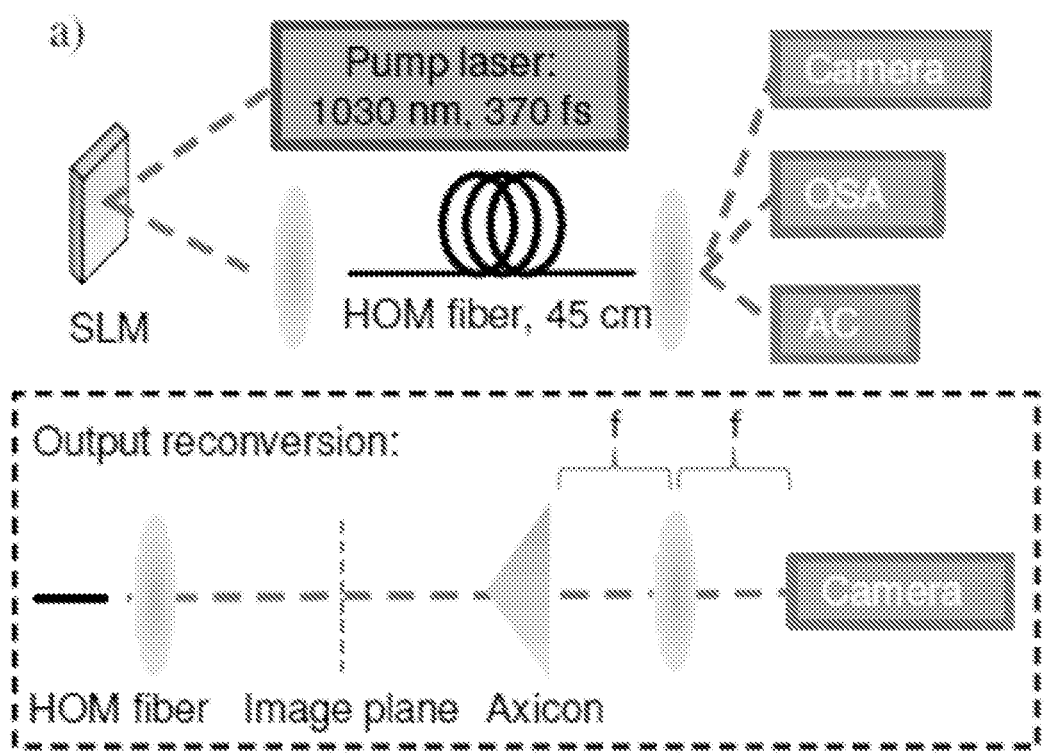
FIG. 18A shows a setup that exhibits SSFS in $LP_{0,m}$ mode.
Figure 18B:
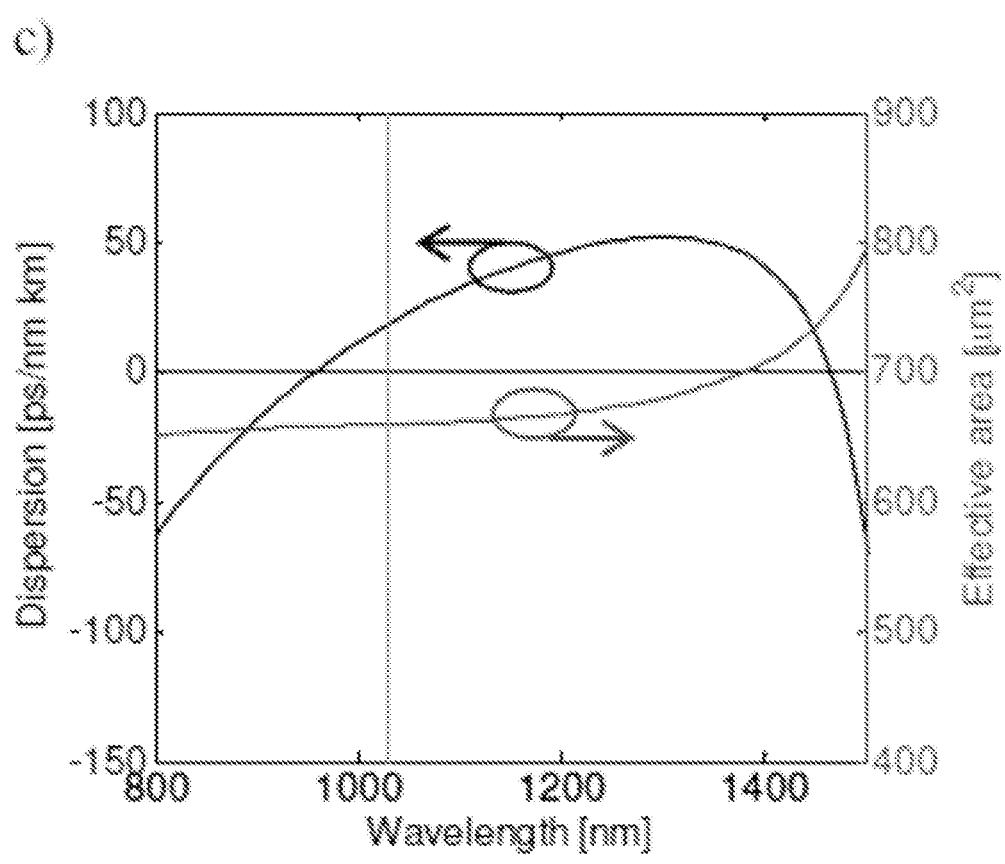
FIG. 18B is a plot of dispersion and effective area versus wavelength for the $LP_{09}$-mode excited using the setup of FIG. 18A.

FIG. 18A shows more specific aspects of a setup that exhibits SSFS in $LP_{0,m}$ mode. The spatial light modulator (SLM) excites the $LP_{0,9}$ mode in a 45-cm long HOM fiber, which is a custom double cladding fiber whose guidance diameter (GD) is 53 um with an index step of 0.02. The refractive index profile for this fiber is shown in FIG. 3. The dispersion and effective area for the $LP_{0,9}$ mode at the pump wavelength is D=+18.4 ps/nm-km and $A_{eff}$=660 $\mu m^2$ (FIG. 18B). The combination of both these values is not obtainable using a PCF, since to achieve this high dispersion level at this wavelength would require shrinking the effective area down to ~10 $\mu m^2$. So even though similar soliton shifting dynamics would be possible in PCFs as shown by eq. (1) this would occur at much lower soliton energies, typically less than 1 nJ.

Figures 19A, 19B, 19C:
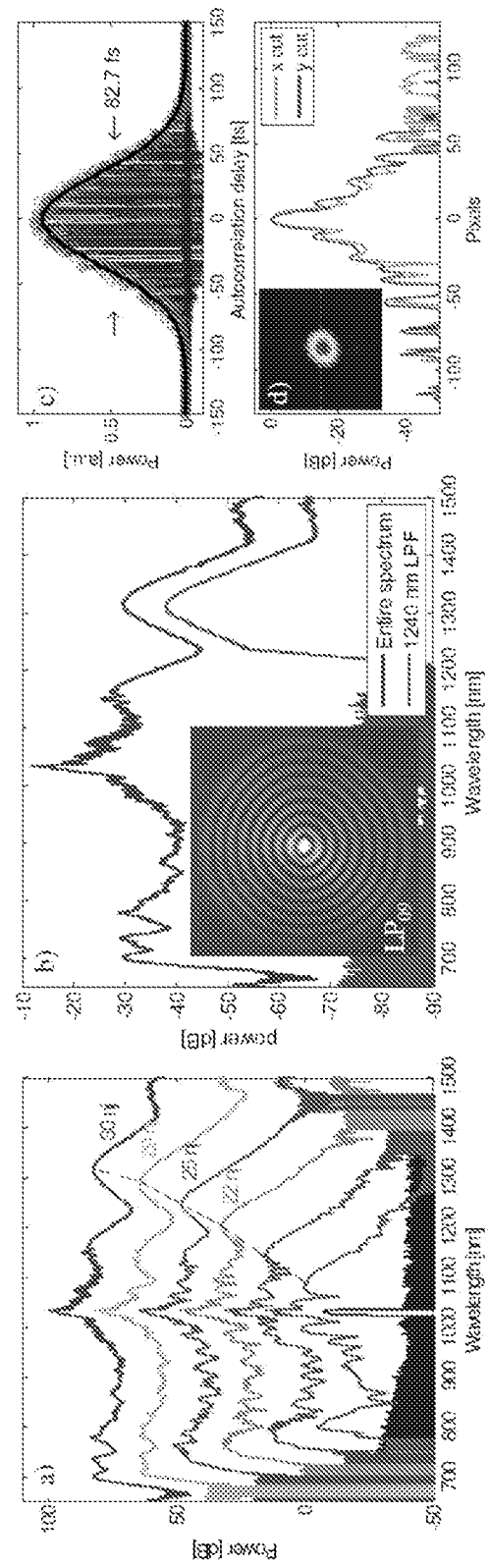
FIGS. 19A-19C are plots of output spectra, autocorrelation measurements, and output mode re-conversion.

FIGS. 19A-19C show various values of interest. FIG. 19A shows the output spectra for progressively increasing launched pump pulse energies (spectra vertically offset for clarity). Initially, at the onset of nonlinearities, the soliton is still merged with the continuum, and emission from Cherenkov radiation starts to build up at ~800 nm (as theoretically predicted). As the launched power is increased, a clear shifted fundamental soliton is evident and spectrally separated from the rest of nonlinear products, thus allowing for spectral filtering and use as a standalone ultrafast source. For our pump and set up, spectrally separated emission first appears at 1207 nm, and thereafter, the soliton shifts continuously to 1317 nm as the pump energy is increased (the dashed black line tracks the spectral peak position of the shifted soliton). In, for instance, the yellow trace (second from above) a second first order soliton is observed at approximately 1100 nm, which will also be in the $LP_{0,9}$ mode. The output pulse energy of the fundamental solitons are measured using a power meter along with spectral filters to isolate the soliton from the spectrum.

FIG. 19B shows an example of the above. The lower trace is the filtered spectrum using a 1250 nm longpass filter. The inset is an image of the filtered soliton which clearly shows that the output is a pure $LP_{0,9}$ (same as the pump mode). The measured energy of this shifted soliton at different wavelengths is denoted next to the spectral traces in FIG. 19A—a 30-nJ pulse at 1317 nm is obtained, the farthest shift in this experiment.

FIG. 19C shows measured autocorrelation (full width at half maximum—FWHM) width is 82.7 fs, which corresponds to a pulse, with secant-hyperbolic distribution in time ($sech^2$ pulse) of 53.6 fs duration. The measured spectral bandwidth is 50 nm (FWHM), which represents a transform limited pulse width of 39 fs. Thus the measured bandwidth product is 0.432 as opposed to the transform limited 0.315 for a $sech^2$-pulse. This additional broadening may be due to optical components between the HOM fiber and the autocorrelator.

The output soliton at ~1300 nm is converted back to a Gaussian-like beam using an axicon, as shown in FIG. 18A. More information regarding mode conversion techniques is given below. Line cuts of the converted beam (FIG. 19C) reveal that a substantially Gaussian-shaped beam, with sidelobes suppressed by >15 dB, is obtained.

In summary, the above demonstrates soliton shifting in a 660-μm$^2$ $A_{eff}$ $LP_{0,9}$ mode of a multimode fiber. Wavelength shifts of almost 300 nm are obtained, so that the technique can access the technologically important 1300-nm spectral range. Peak powers of ~0.56 MW and pulse energies of 30 nJ are obtained for an ultrashort pulse (53.6 fs) directly emitted from a fiber laser with no external pulse compression. Also note that the output at 1300 nm is a highly spatially coherent beam, which allows conversion back to a Gaussian-shaped beam with a simple axicon device. Given the inherent flexibility in independently designing dispersion and $A_{eff}$ with HOMs, it is expected that the technique is scalable to higher pulse energies as well as extendable to other spectral ranges, such as the mid-IR.

Figure 20:
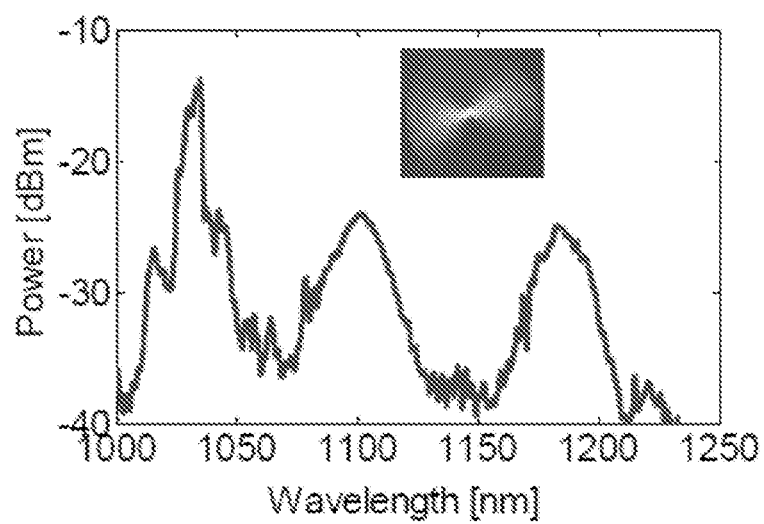
FIG. 20 is a plot of power versus wavelength illustrating SSFS in a low-index polymer coated fiber.

FIG. 20 illustrates SSFS in a low-index polymer coated fiber such as that of FIG. 5, using a setup similar to that illustrated in FIG. 17. In this case the $LP_{0,17}$ mode is launched. The obtained spectrum is shown in FIG. 20, and the inset shows the mode image obtained by spectrally filtering out the right-most peak at 1190 nm. The mode image in this case does not consist of concentric rings, but rather has a "bowtie" shape. This is due to a change in the eigenbasis for this fiber caused by vectorial effects due to the large index step at the boundaries. This is however still a single spatially coherent mode.

Figure 21A:
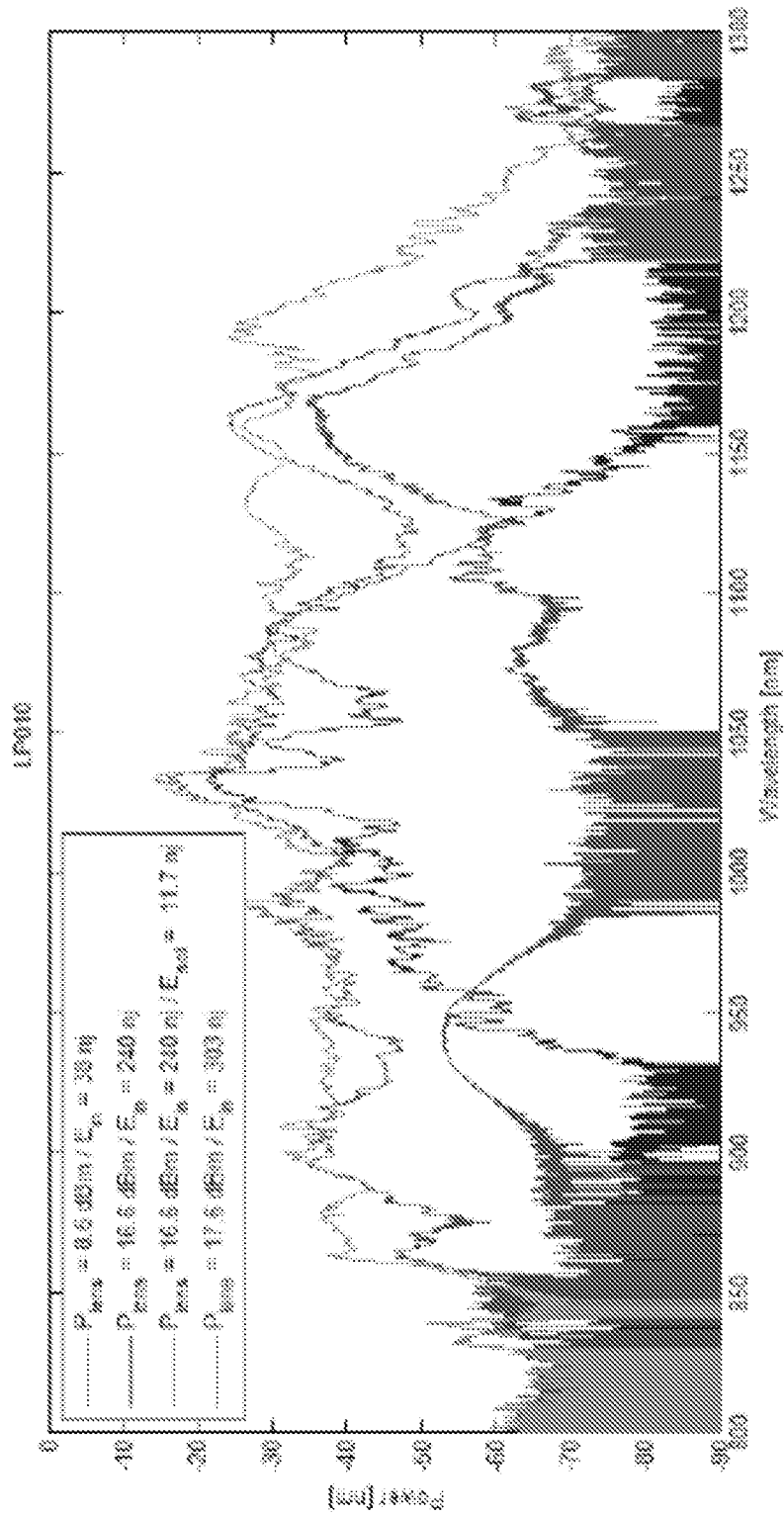
FIGS. 21A and 21B show soliton shifting spectra and mode image respectively in an air-cladding fiber.
Figure 21B:
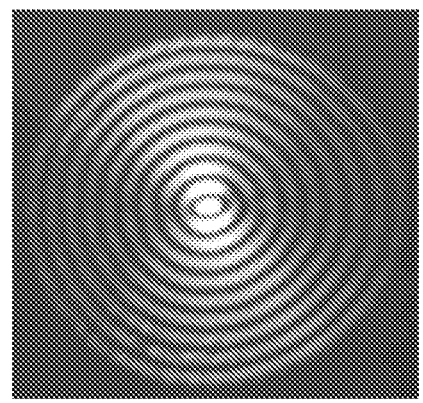

FIGS. 21A and 21B show soliton shifting spectra and mode image respectively in air-cladding fiber such as that of FIG. 6. In these experiments the $LP_{0,10}$ mode is excited. FIG. 21B shows the mode image of the spectrally filtering peak at 1090 nm in the blue trace, which is also the $LP_{0,10}$ mode, same as the pump mode.

Figure 22:
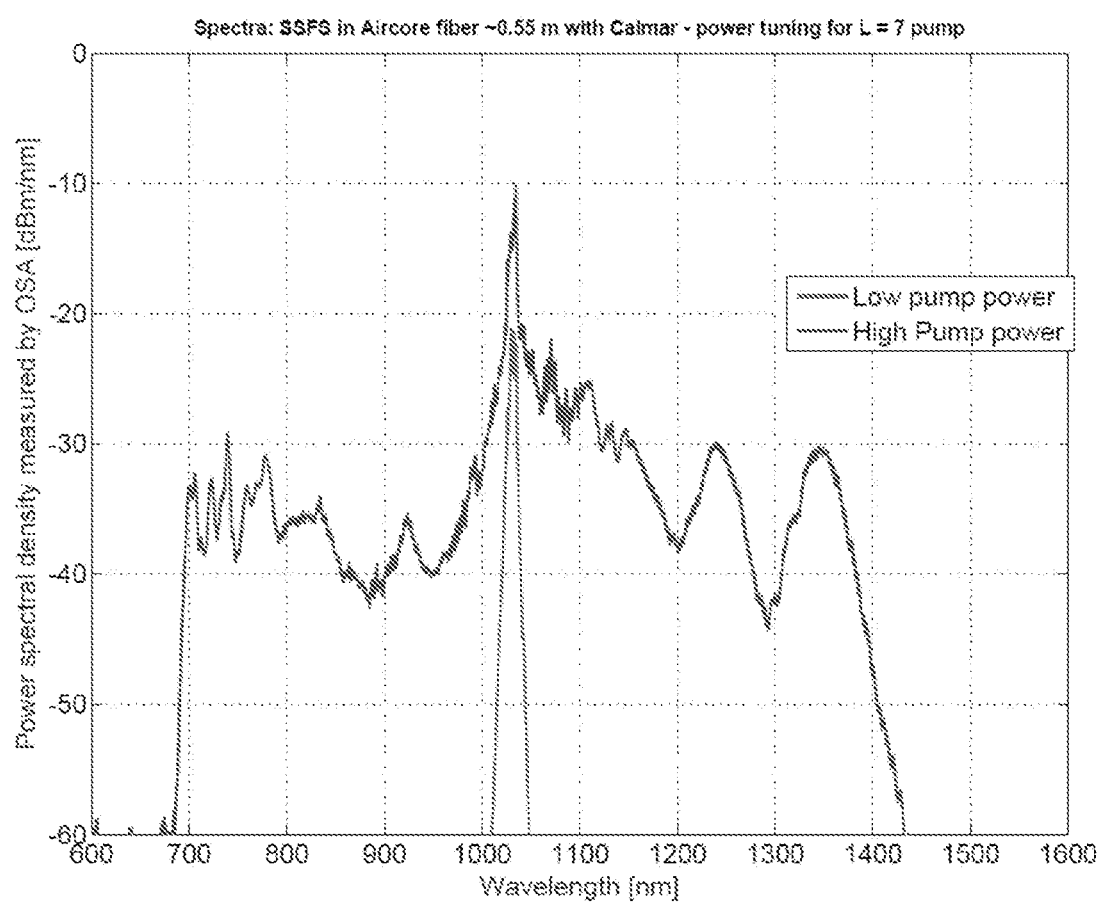
FIG. 22 is a plot of power versus wavelength showing soliton shifting in an OAM mode in an air core fiber.

FIG. 22 shows results of soliton shifting in an OAM mode in the air core fiber of FIG. 8, whose dispersion curves are shown in FIG. 16. FIG. 22 shows obtained spectra for both low (narrow trace) and high (wider trace) pump power. Thus soliton dynamics are observed for the higher power input pulse. The launched mode has an OAM value of L=+7.

Figure 23:
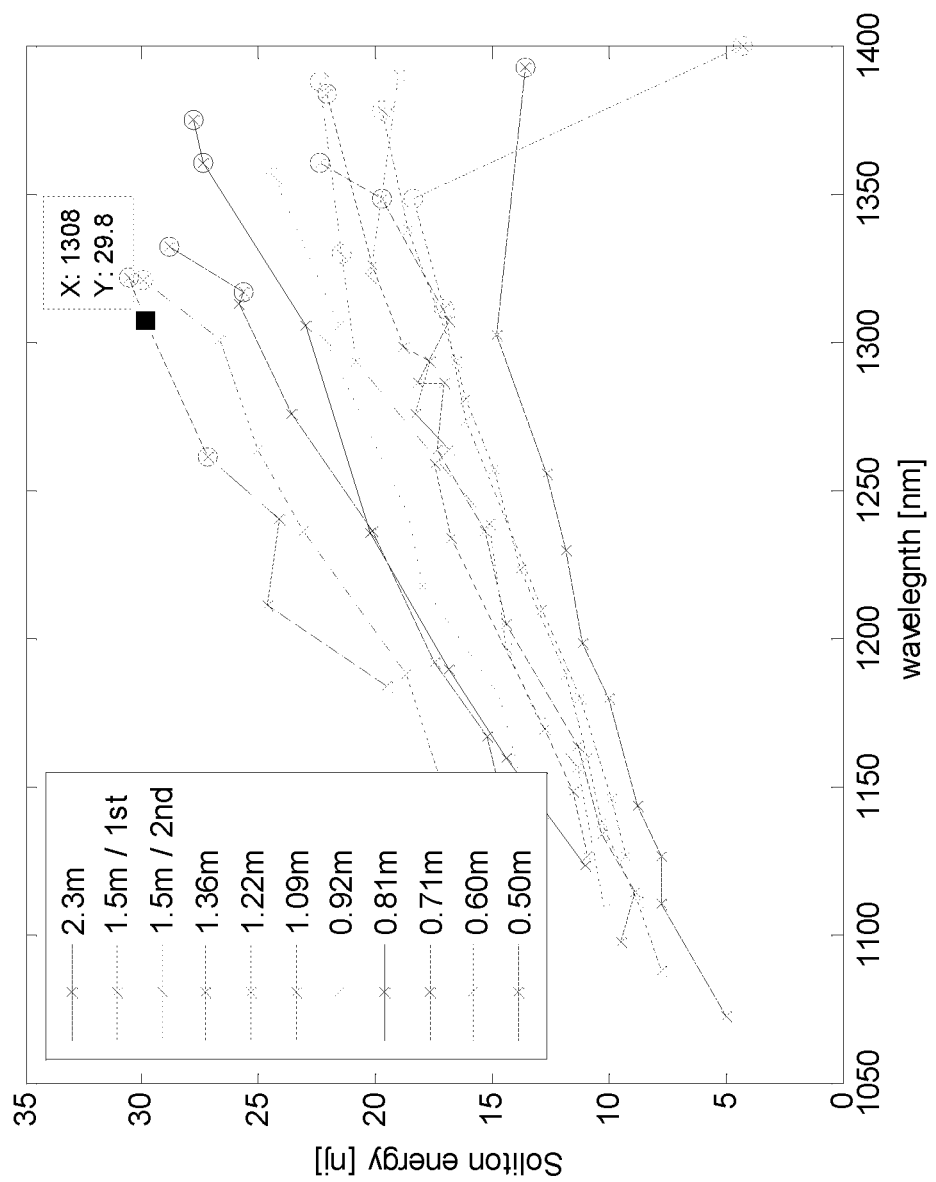
FIG. 23 is a plot of output energy versus wavelength for fibers of different lengths.

FIG. 23 illustrates another aspect of the system configuration, namely how fiber length can be used to control the output energy of the soliton at a certain wavelength. These measurements are based on the same fiber and system as presented in FIG. 19. In this experiment a mode was launched in a fiber sample and for different launched pump powers the soliton achieved different wavelength shifts, the soliton energy was measured at these different wavelengths. This was repeated for different fiber lengths. FIG. 23 illustrates that, for a given desired wavelength output (e.g., 1300 nm), controlling the fiber length enables controlling the soliton energy—specifically, the pulse energy obtained at a given wavelength increases with decreasing fiber length. The required launched pump power increases as the fiber length is decreased to ensure the desired shift (e.g., out to 1300 nm).

Figure 24:
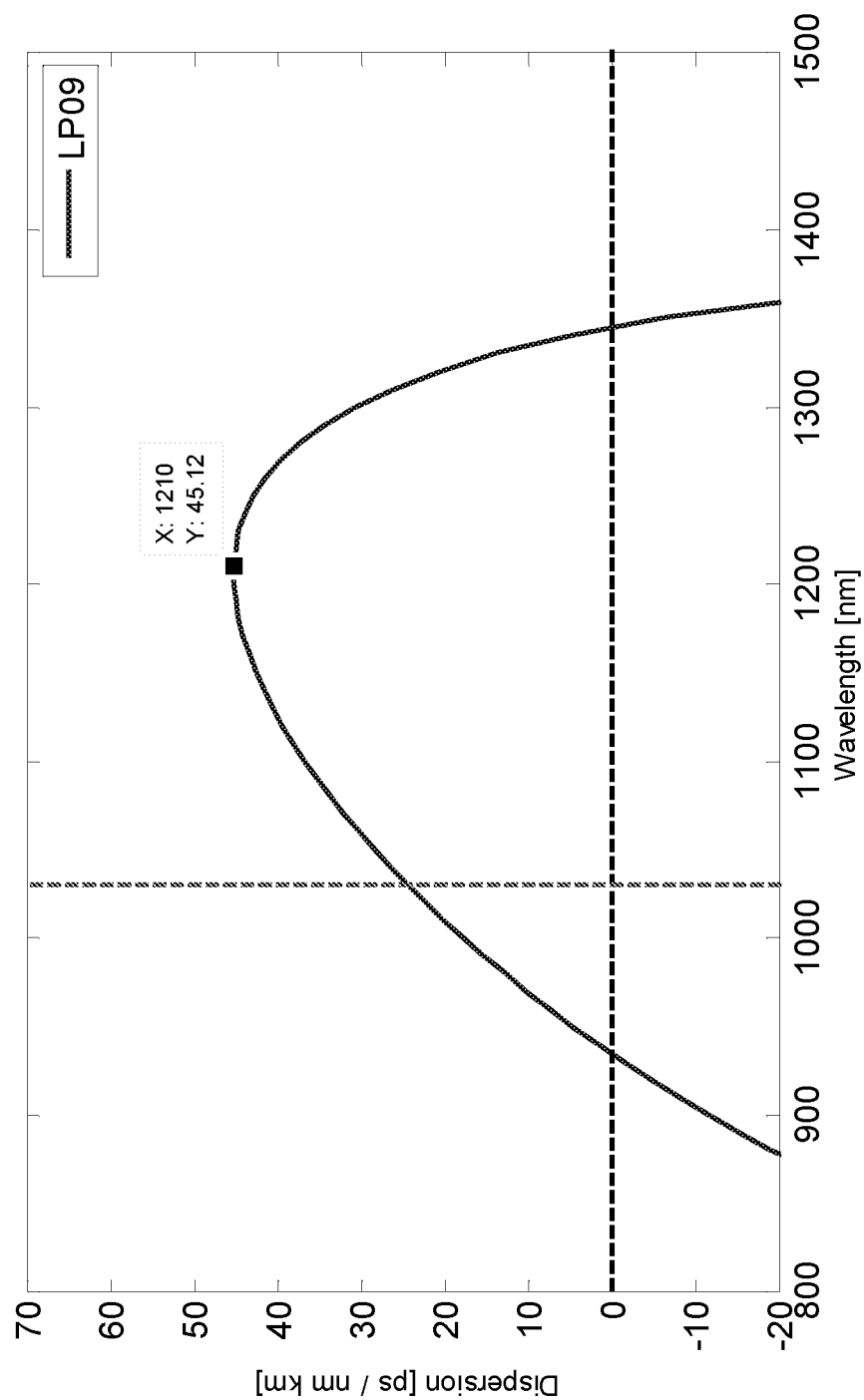
FIG. 24 is a plot of a dispersion profile for the $LP_{0,9}$ mode of a HOM fiber.

FIG. 24 shows a desired dispersion profile for the $LP_{0,9}$ mode of a HOM fiber in which temporal pulse narrowing may be achieved. As described in eq. (1) the energy of the soliton is proportional to the dispersion, the effective area, and the spectral bandwidth of the soliton. In this section it is described how this relationship can lead to temporal pulse compression of the soliton.

As the soliton shifts towards longer wavelength beyond 1210 nm the dispersion of the modes starts to decrease. Thus in order for the soliton to fulfil eq. (1) as it continues to propagate through the fiber, the soliton must reshape itself, because its energy remains nearly constant. This reshaping leads to an increase in spectral bandwidth to counteract the decreasing dispersion, meaning that the pulse reshapes itself into one of narrower duration.

Figure 25:
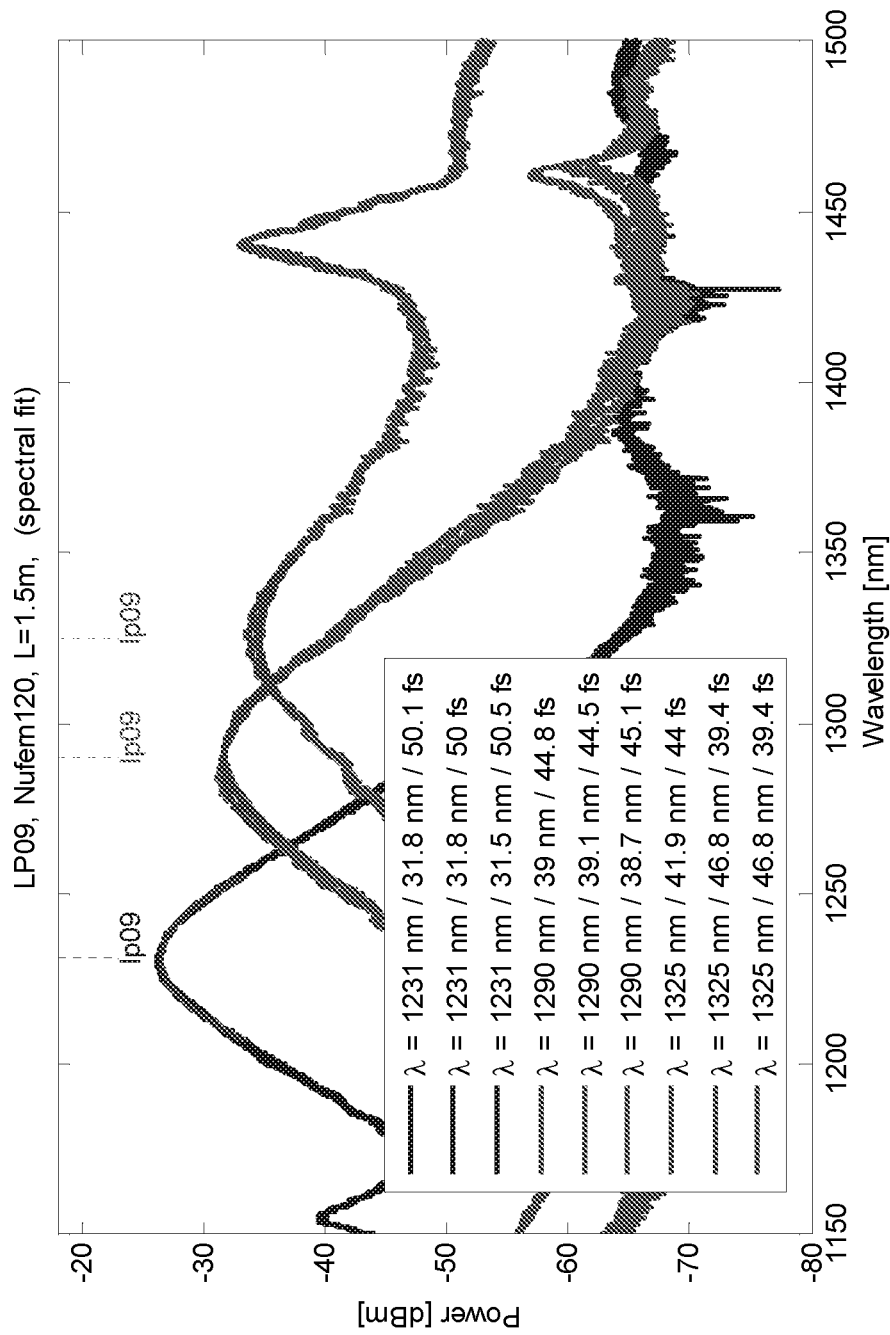
FIG. 25 is a plot showing that soliton spectral bandwidth increases with increasing soliton shift in a mode with dispersion characteristics as shown in FIG. 24.

FIG. 25 shows the above effect, i.e., that soliton spectral bandwidth increases with increasing wavelength shift (obtained by increasing the pump power). In this case the spectral width of the pulse increased from about 32 nm to 47 nm, meaning the supported pulse width decreases from 50 fs to 40 fs. Note that similar results can be obtained by holding pump power constant and modifying the length of the fiber.

As described above with reference to FIG. 10, it is possible via fiber design (tailoring the index step and guidance diameter) to control the dispersion of a given mode, including the general design parameters with which one can tailor the fiber for a particular mode's dispersion to start decreasing. Thus via fiber design it is possible to control at which wavelength the temporal narrowing will occur for a shifting soliton. Furthermore, it is possible to control this by appropriate choice of mode order.

Intermodal Raman Scattering

This section describes a separate phenomenon in multi-moded fibers, which is referred to as intermodal Raman scattering for reasons that will be apparent. This process can provide even wider wavelength tunability than the above SSFS process, further enhancing the prospects of a platform for building tunable-wavelength ultrafast lasers. The process is related to interpulse and intermodal discrete energy transfer between two pulses traveling with the same group velocity through a fiber, as is described in more detail below.

The process of Raman scattering is the interaction between two photons and a phonon (a molecular vibration). Typically a high energy (low wavelength) photon interacts with the material and creates a lower energy (higher wavelength) photon and a phonon.

Figure 26:
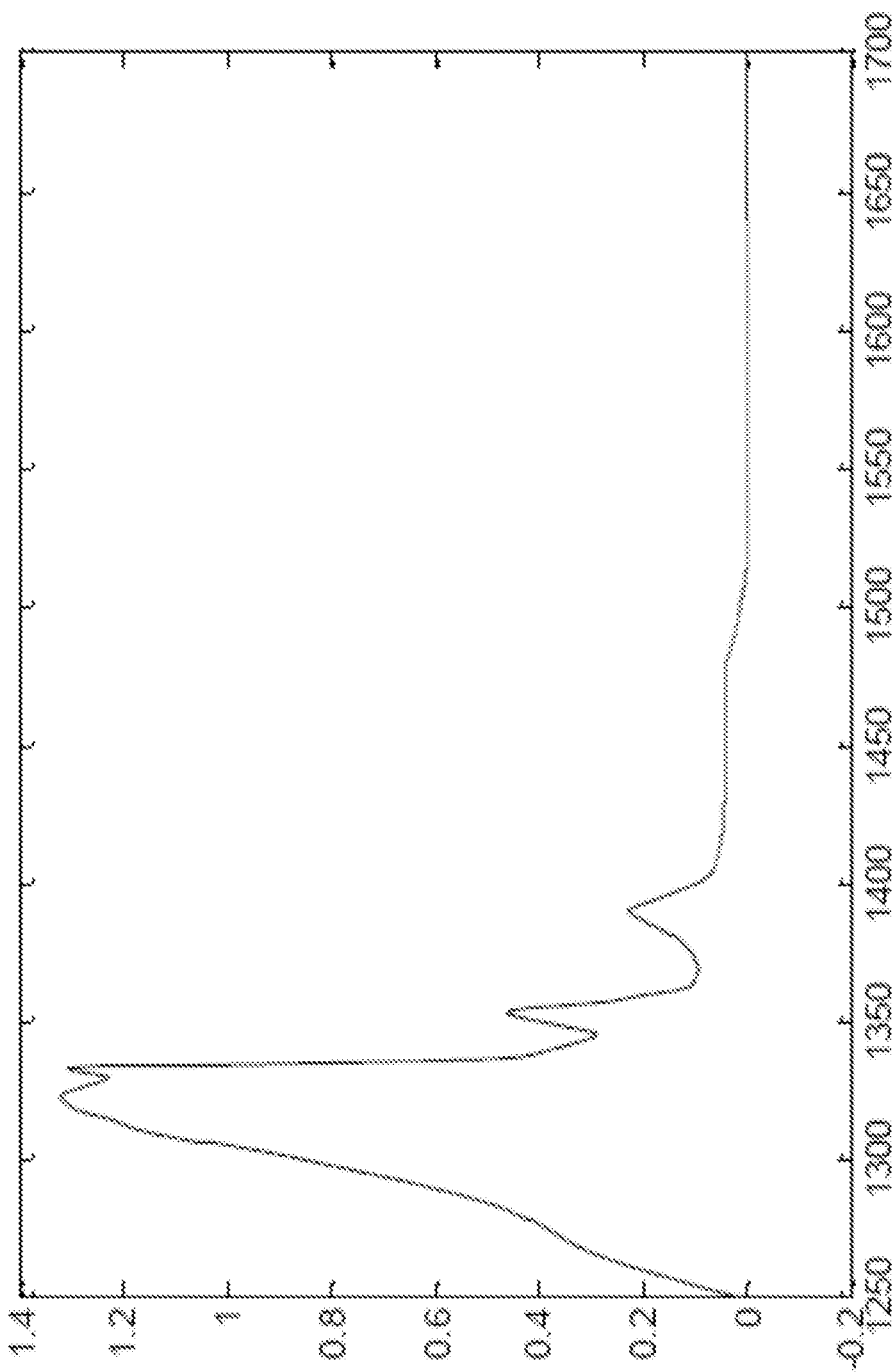
FIG. 26 is a plot of Raman gain coefficient for silica as a function of wavelength.

FIG. 26 shows the Raman gain coefficient for silica as a function of wavelength. In this example the pump photon is at 1250 nm, but as this is self-phase-matched process (meaning that the two photons—incident and scattered, and the phonon, automatically adjust their relative phases to make this process efficient), the pump could be at any wavelength. An important aspect is that, in silica fibers, the peak of the Raman gain curve is always at 13 THz lower in frequency than the pump. So in this example, if the pump is at 1250 nm the gain peak will be at 1321 nm as seen in FIG. 26 (note that lower frequency corresponds to longer wavelength). The efficiency of this Raman coupling process is proportional to the intensity overlap integral $f_{i,j,k,l}$ between the two interacting optical modes, which is given in eq. (2) below:

$$f_{ijkl} = \frac{\langle F_i^* F_j^* F_k F_l \rangle}{[\langle |F_i|^2 \rangle \langle |F_j|^2 \rangle \langle |F_k|^2 \rangle \langle |F_l|^2 \rangle]^{\frac{1}{2}}}, \quad (2)$$

where F denotes amplitude of the optical fields, the subscripts i,j,k,l denote different fields, * denotes complex conjugation, the symbol denotes the absolute value of the field $F_i$, and < . . . > denotes integration over the cross-section area of the integrand " . . . ".

In single mode fibers, stimulated Raman scattering (SRS) using quasi-CW pump pulses scatters light from the pump to a discrete new wavelength close to the Raman gain peak as temporal walk-off between these two wavelengths is negligible. In contrast for ultrafast pump pulses, the lack of group index matching between pulses separated by 13 THz makes such a discrete transfer not possible. Instead, one observes SSFS that continuously increases the center wavelength of the pulse, as was demonstrated in the previous section.

Figure 27:
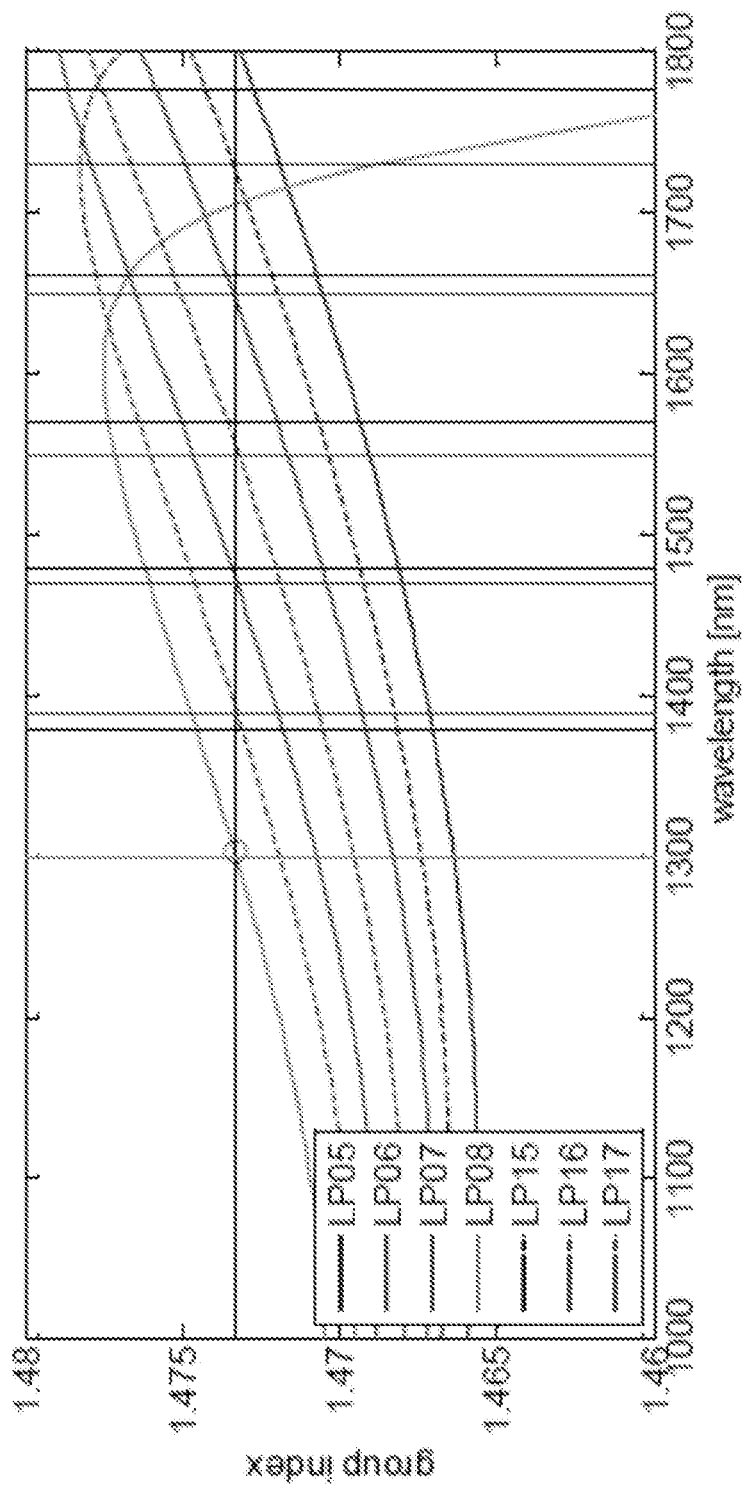
FIG. 27 is a plot of group index versus wavelength for a selection of modes in a fiber.

However, in a multimode fiber, group velocities of two modes can be identical even at large spectral separations. FIG. 27 shows group index versus wavelength for a selection of modes in a fiber having the refractive index profile of FIG. 3. The horizontal line is used to indicate that numerous modes at different wavelengths have this exact same group. This means that, for example, the $LP_{0,8}$ mode at 1300 nm and the $LP_{1,7}$ mode at 1390 nm travel through the fiber with the same group velocity. Hence, these two modes at different wavelengths do not temporally walk-off from each other. The vertical line at 1380 nm is exactly 13 THz away from the vertical line at 1300 nm for the $LP_{0,8}$ mode. Similarly, the vertical line at 1480 nm is 13 THz away from the vertical line at 1390 nm for the $LP_{1,7}$ mode, and so on. This illustrates that the spacing in frequency between these group index matched modes indicated by the horizontal line all are separated by approximately 13 THz, and thus these modes can transfer energy to each other via Raman scattering as this coincides with the peak of the Raman gain coefficient.

Figure 28:
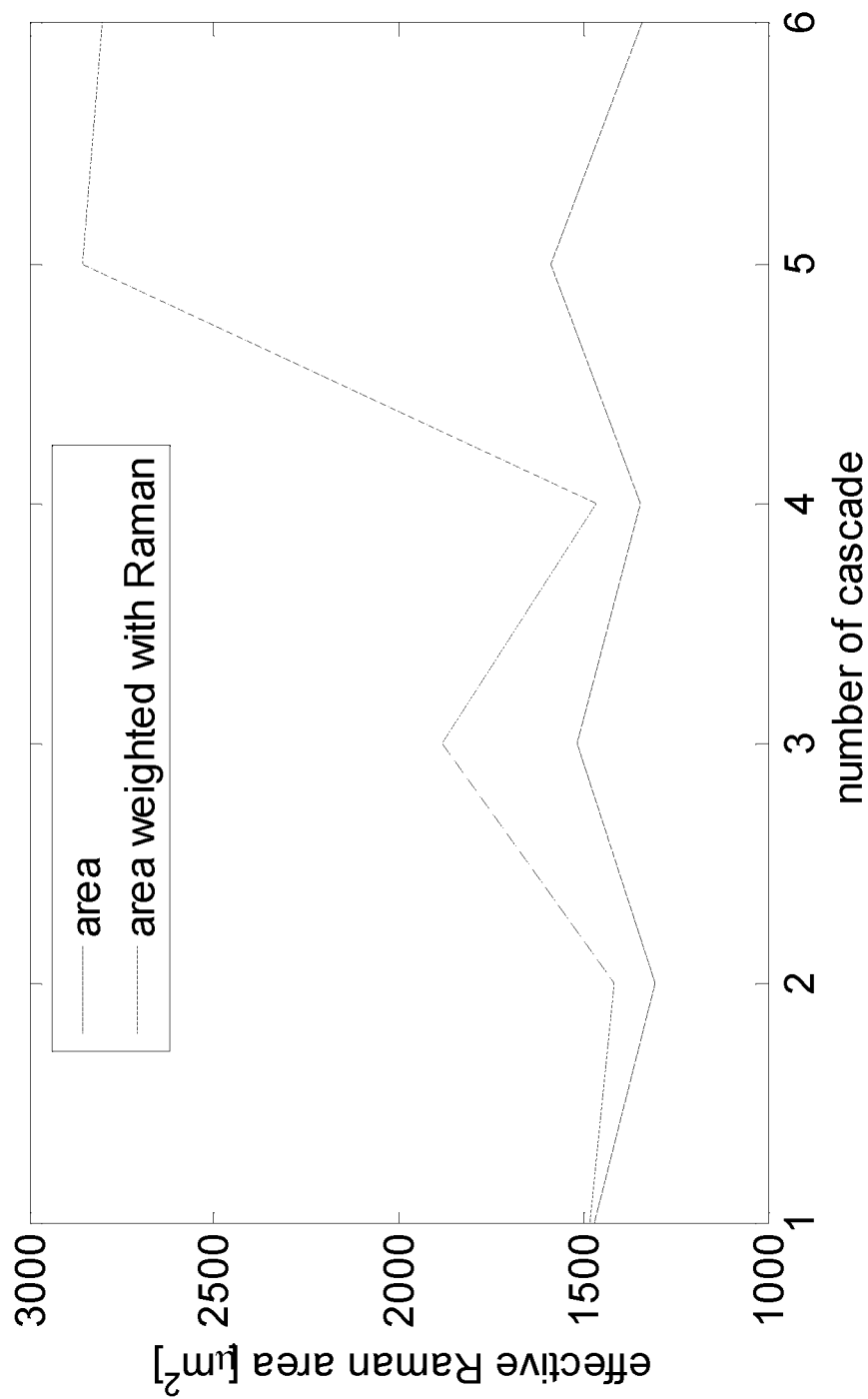
FIG. 28 is a plot of effective Raman area versus cascade order.

FIG. 28 shows a plot of effective Raman area [inverse of eq. (2)] versus cascade order for the process of FIG. 27. Intermodal Raman scattering requires that the overlap integral in eq. (2) be non-zero. The effective Raman area is the inverse of the overlap integral. In FIG. 28, the horizontal axis represents one or multiple instances of this intermodal process occurring, since once a new wavelength has been created by this process, light with sufficient energy at this wavelength may act as a pump for a subsequent intermodal interaction of a similar kind, to an even longer wavelength. Each instance of this intermodal Raman scattering occurrence is henceforth identified as a cascade number, to signify that this process may be cascaded in nature. The number one cascade order is the effective Raman area between the $LP_{0,8}$ mode at 1300 nm and the $LP_{1,7}$ mode at 1390 nm, the number two cascade order is the effective Raman area between the $LP_{1,7}$ mode at 1390 nm and the $LP_{0,7}$ mode at 1480 nm, and so on. The upper trace on the plot is furthermore weighted with the strength of the Raman gain coefficient at these wavelength separations. What this indicates is that the process where the effective Raman area weighted by the Raman gain coefficient is smallest is the process that will dominate. Hence, for this fiber, it is expected that light will experience discrete Raman cascades up to the fourth order. Beyond that, the weighed area becomes too large for the process to be efficient. This points to a way, by means of fiber design, to control the number of cascades or wavelength shifts that occur within a fiber.

Figure 29:
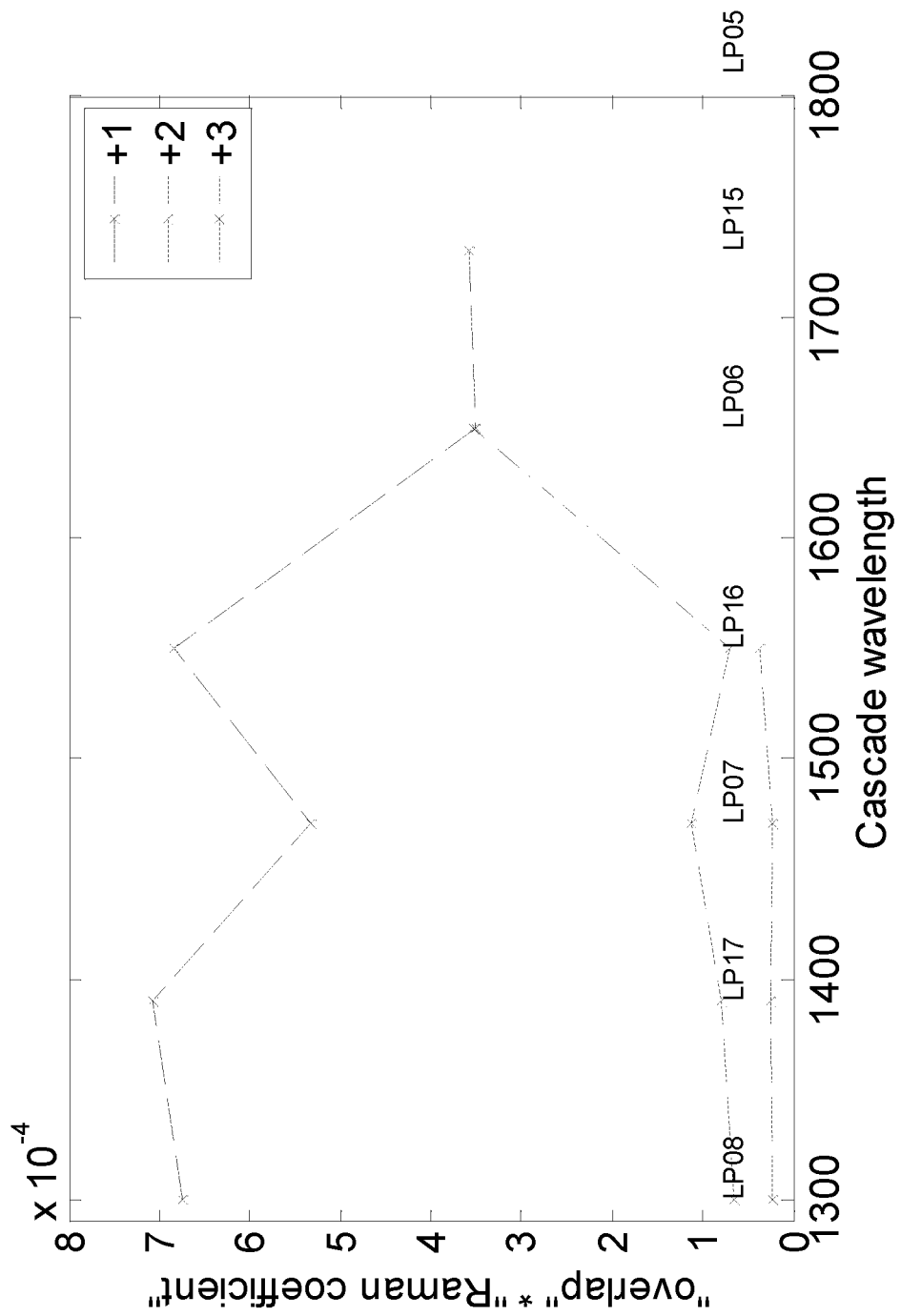
FIG. 29 is a plot showing a comparison between the strength of different intermodal processes.

FIG. 29 shows a comparison between the strength of different cascade processes. Note that, unlike in FIG. 28, here the y-axis is the overlap integral multiplied by the Raman gain coefficient at the subject wavelength separation—thus, this axis plots a parameter that is approximately the reciprocal of the parameter plotted in the y-axis of FIG. 28. As a result, in comparing various processes in FIG. 29 (or FIG. 31 discussed below), the process with the largest value (on the y-axis) is the most efficient and hence the process most likely to occur in the fiber.

In FIG. 29, the process '+1' indicates that the coupling goes to nearest group index matched mode, so in this case from $LP_{0,8} \rightarrow LP_{1,7} \rightarrow LP_{0,7} \rightarrow LP_{1,6} \rightarrow LP_{0,6}$ and so on. The process '+2' indicates that a nearest group index matched mode is skipped, so in this case from $LP_{0,8} \rightarrow LP_{0,7} \rightarrow LP_{0,6}$ and so on. The process '+3' indicates that two nearest group index matched modes are skipped, so in this case from $LP_{0,8} \rightarrow LP_{1,6} \rightarrow LP_{0,5}$ and so on.

For this fiber it is seen that the strongest process is '+1', which means the cascade alternates between $LP_{0,m}$ and $LP_{1,m}$ modes, which is also expected based on FIG. 27.

Figure 30:
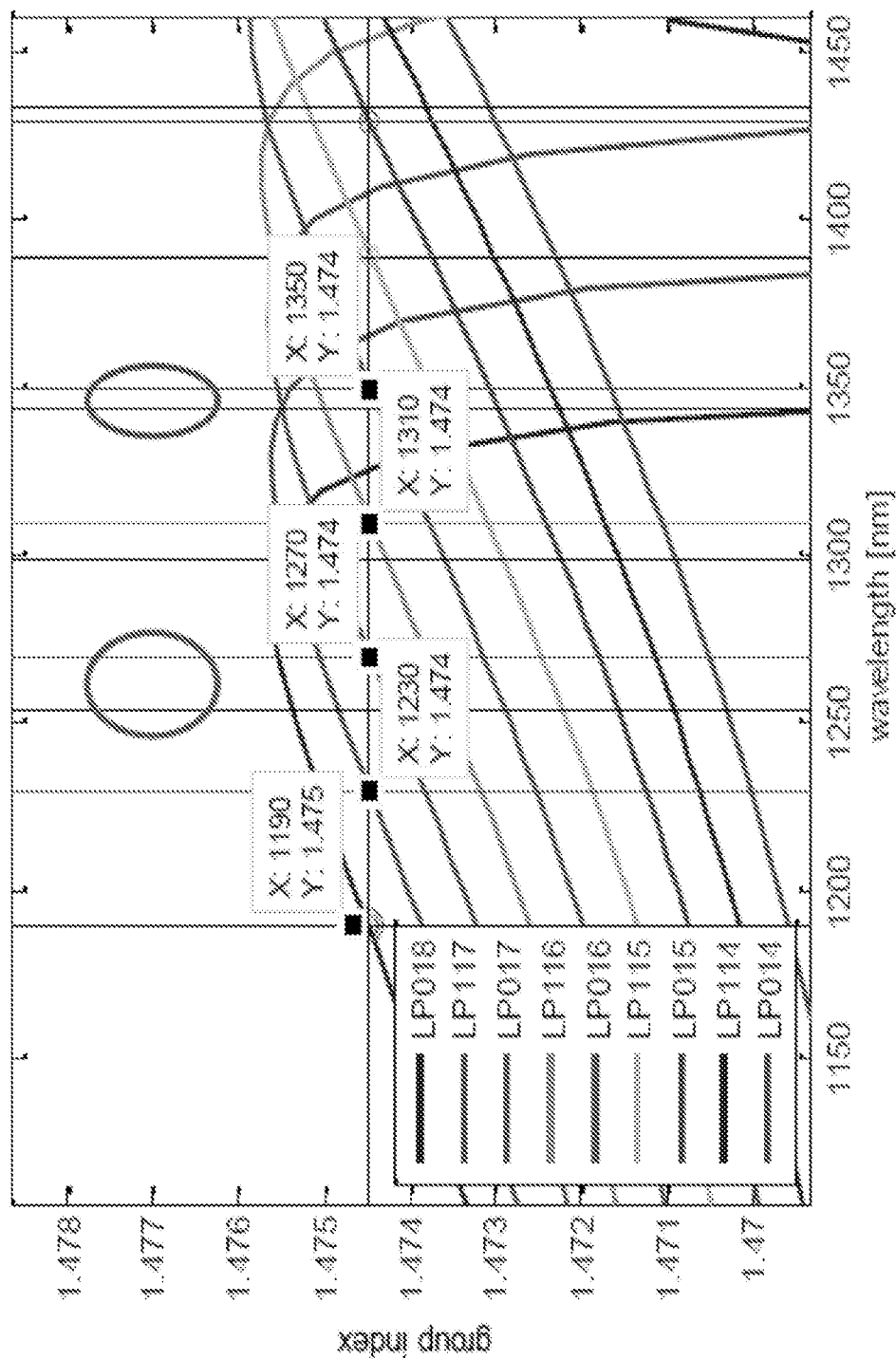
FIGS. 30 and 31 are plots similar to those of FIGS. 28 and 29 for a different fiber.
Figure 31:
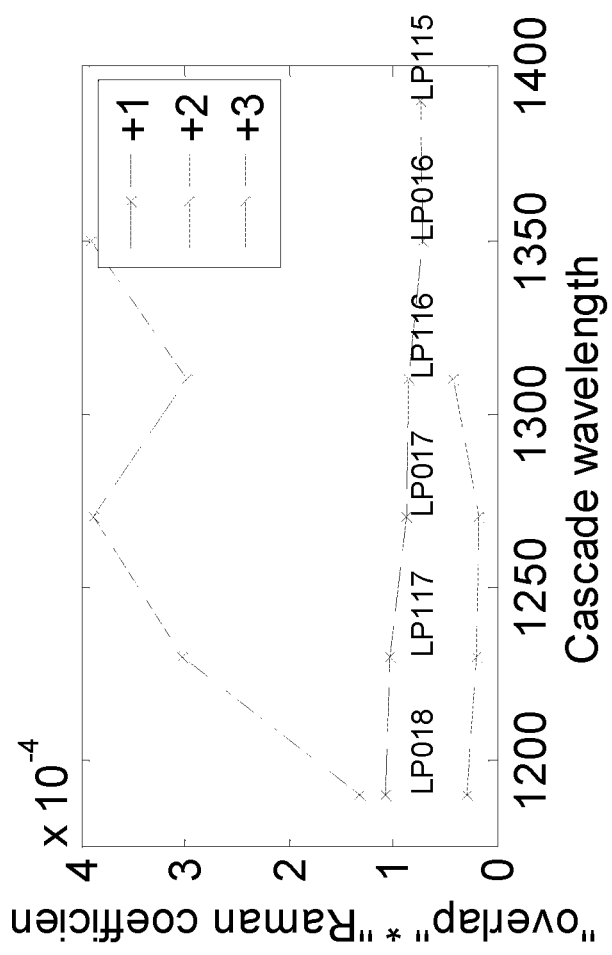

FIGS. 30 and 31 show similar data for a fiber having a GD of 105 µm, while the results of FIGS. 28-29 are for a fiber having a GD of 50 µm. As shown, the group index curves are more closely spaced. For this fiber the $LP_{0,18}$ mode at 1190 nm has the same group index as both the $LP_{1,17}$ mode at 1230 nm and the $LP_{0,17}$ mode at 1270 nm. However, based on this plot alone it may be difficult to estimate which of these two latter modes the $LP_{0,18}$ mode is more likely to couple to. Considering the plot of FIG. 31 for this fiber, the '+2' process is more likely as that trace is larger in value. This means that this process is expected to go only between $LP_{0,m}$ modes, in this case $LP_{0,18} \rightarrow LP_{0,17} \rightarrow LP_{0,16}$.

The above illustrates that a soliton can transfer energy to a lower mode order via an intermodal and interpulse process. In comparison to the SSFS process, this new process yields much larger, discrete wavelength jumps, enabling creating both widely wavelength tunable sources, as well as enabling multi-colored sources. Group index matching is a key parameter in controlling this intermodal and interpulse nonlinear process. Since group indices may be controlled by fiber design, it is possible to tailor the cascade process both in terms of which modes are interacting and the number of cascades that will occur.

Figure 32:
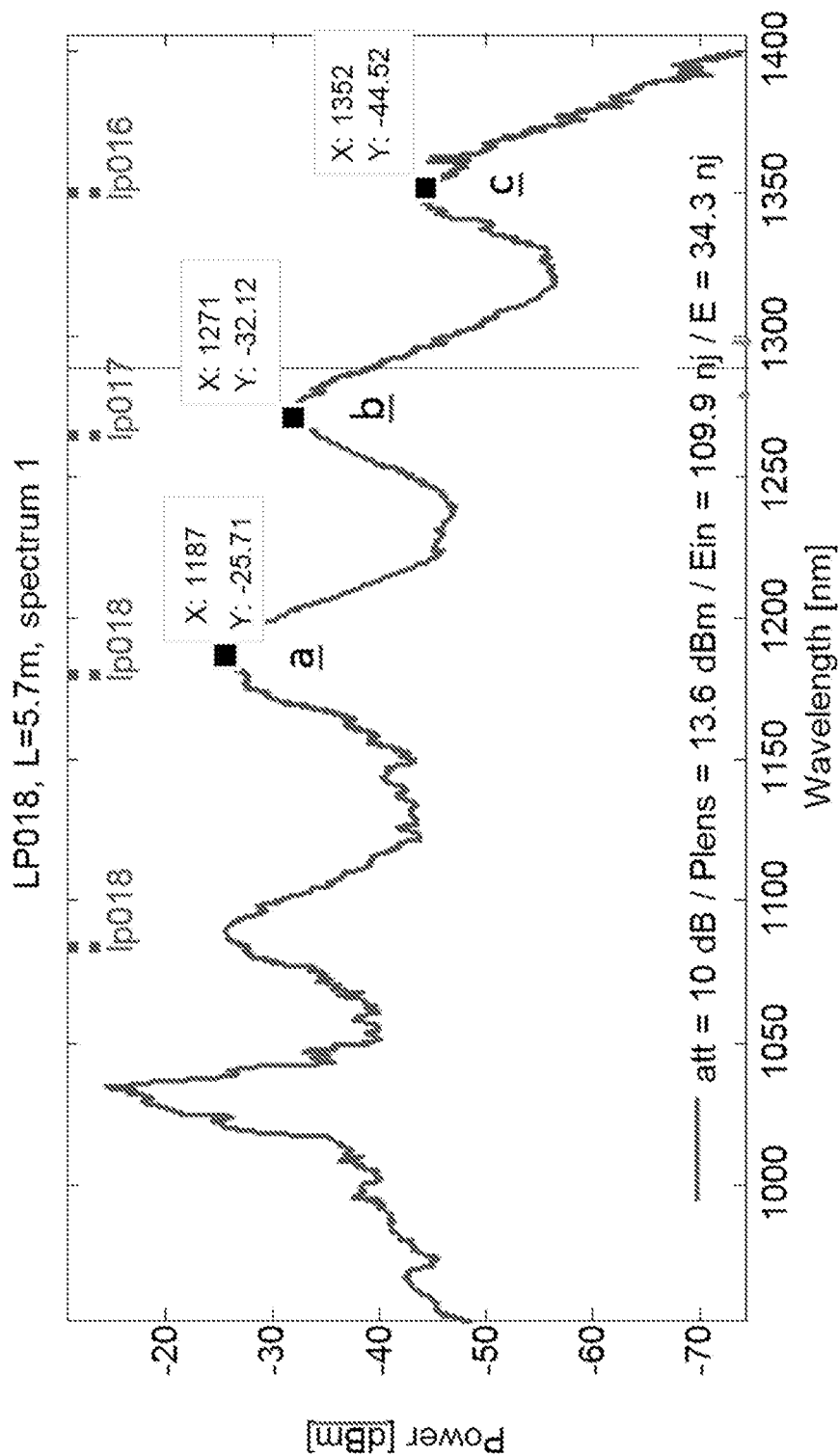
FIG. 32 shows an output spectrum for an experiment in which the pump pulse is launched in the $LP_{0,18}$ mode in a fiber with a guidance region of 105 μm.

FIG. 32 shows an output spectrum for an experiment in which the pump pulse is launched in the $LP_{0,18}$ mode in a fiber with a guidance region of 105 µm. For this pump power two solitons in the $LP_{0,18}$ mode are formed at 1080 nm and 1187 nm, which is similar to the behavior observed in FIG. 19 for traditional S SFS, although with the additional feature of being at much higher energies than was previously possible. However, two additional spectral features appear at 1271 and 1352 nm, these are in the $LP_{0,17}$ and $LP_{0,16}$ modes, respectively.

Figure 33:
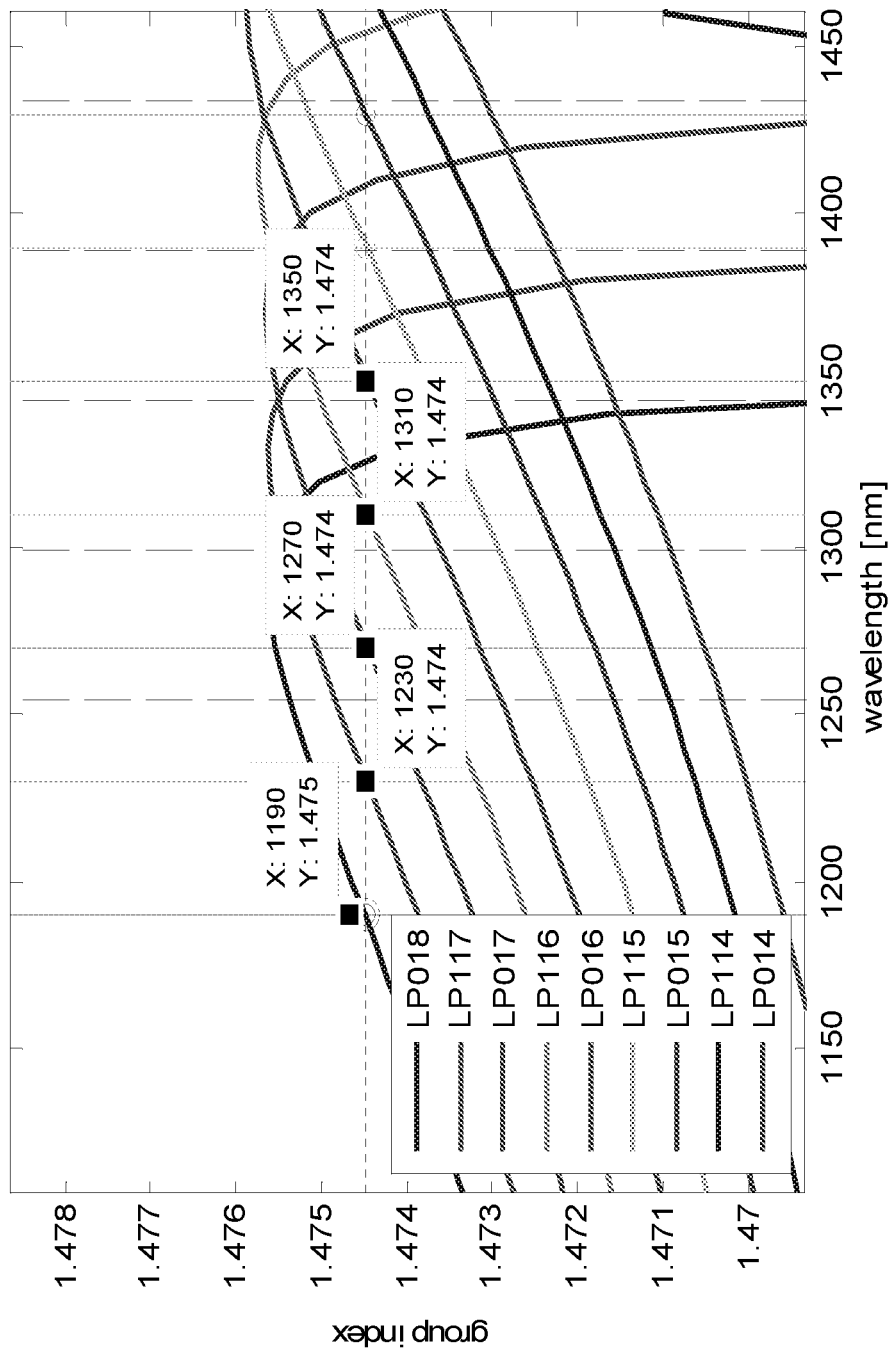
FIG. 33 illustrates a simulation showing that different modes at different wavelengths all have the same group index.

FIG. 33 illustrates a simulation showing that the $LP_{0,18}$ mode at 1187 nm, the $LP_{0,17}$ mode at 1271 nm, and the $LP_{0,16}$ mode at 1352 nm all have the same group index, meaning all these wavelengths travel though the fiber at the same group velocity. Furthermore, these three wavelengths are spaced by approximately 13 THz, which is at the peak of the Raman gain. Thus the process is summarized as follows: The pump in one mode creates a soliton that shifts to a longer wavelength via traditional SSFS. This shifted soliton serves as a second pump signal for generating one or more signals in other modes via intermodal Raman scattering. For sufficiently long fibers and at a specific wavelength (here, at 1187 nm), the group velocity of the shifted-soliton mode matches (i.e. is close or equal to) that of another mode, spectrally separated by an amount roughly equal to that where the peak Raman gain occurs (typically 13 THz in silica fibers). This match, of group velocities as well as a high driving efficiency (arising from the coincidence of the Raman gain peak with this separation), enables coherent transfer of light from the shifted soliton to a new ultrafast pulse in a new mode, vastly spectrally separated from the shifted soliton. Thus, the intermodal Raman scattering process not only allows creating ultrashort energetic pulses at new colors, it vastly enhances the tuning range since shifts as far away as multiple Raman shifts (i.e. multiples of 13 THz) are now possible. This effect normally results in a new pulse in a lower mode order, since group velocities in step index fibers typically increase with mode order as seen in the previous subsection. Thus, the newly created pulse in the new mode may act as a new pump for a subsequent cascaded process to yield an even lower mode order at an even longer wavelength (much the same way as the traditional SSFS process can act as a pump to start this cascade process). Also note that all the new spectral features are in spatially coherent modes, as opposed to a superposition of multiple modes. This means that they can be easily converted back to a desired Gaussian shape, or used to relay through free-space optics (lenses) etc. without leading to beam distortions.

It should be noted that traditional SSFS is not required to generate the mode that will initiate the intermodal and interpulse process. In general, this mode may be generated in any desirable manner. Of course, many embodiments may utilize SSFS due to its convenience, i.e., it readily occurs in the same types of fibers in which the intermodal and interpulse process occurs. Also, in general any given embodiment may utilize one or more than one stages in the cascade to achieve a desired final wavelength. In the example shown above the cascade occurred between $LP_{0,m}$ modes that are all azimuthally invariant. In general, this is not required.

Figure 34:
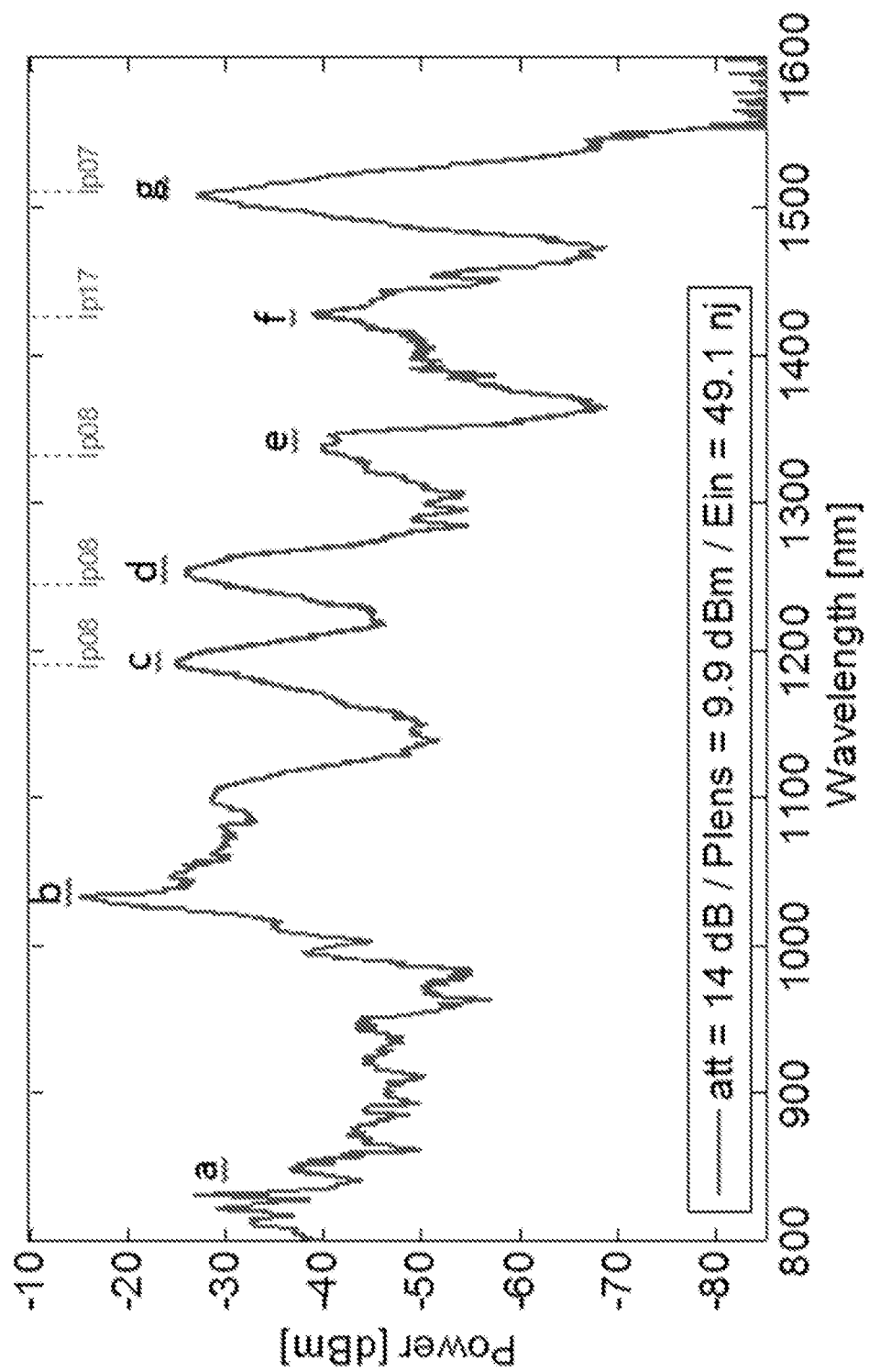
FIG. 34 shows an experiment in which the $LP_{0,8}$ mode is launched in a fiber with a guidance diameter of about 50 μm.
Figure 35A:
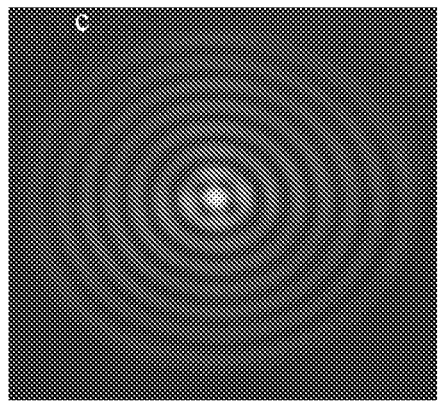
FIGS. 35A-35E show mode images of spectral features.
Figure 35B:
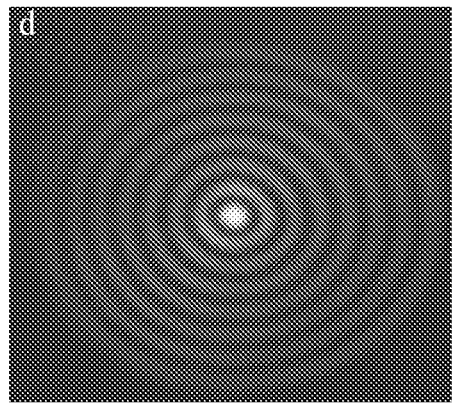
Figure 35C:
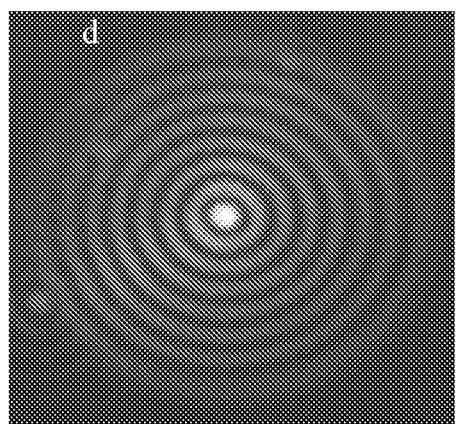
Figure 35D:
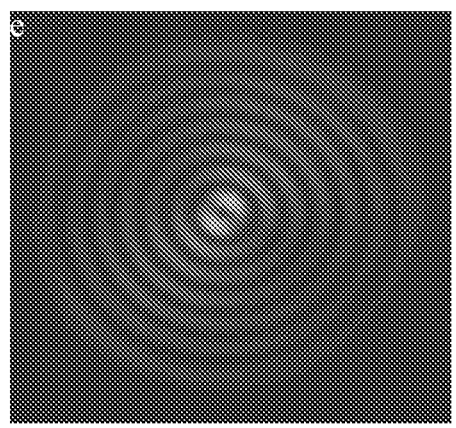
Figure 35E:
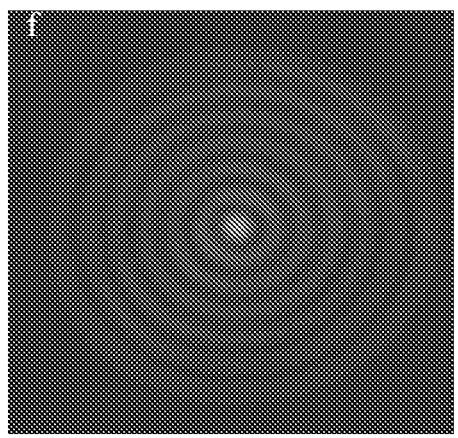

FIG. 34 shows an experiment in which the $LP_{0,8}$ mode is launched in a fiber with a guidance diameter of about 50 µm. The following spectral features are marked:
  'a' is Cherenkov radiation and is in the $LP_{0,8}$ mode
  'b' is residual pump
  'c'-'e' are shifted solutions from the pump in the $LP_{0,8}$ mode
  'f' and 'g' are cascade products in the $LP_{1,7}$ and $LP_{0,7}$ mode, respectively FIGS. 35A-35E show mode images of the spectral features 'c' through 'f' of FIG. 34.

Figure 36:
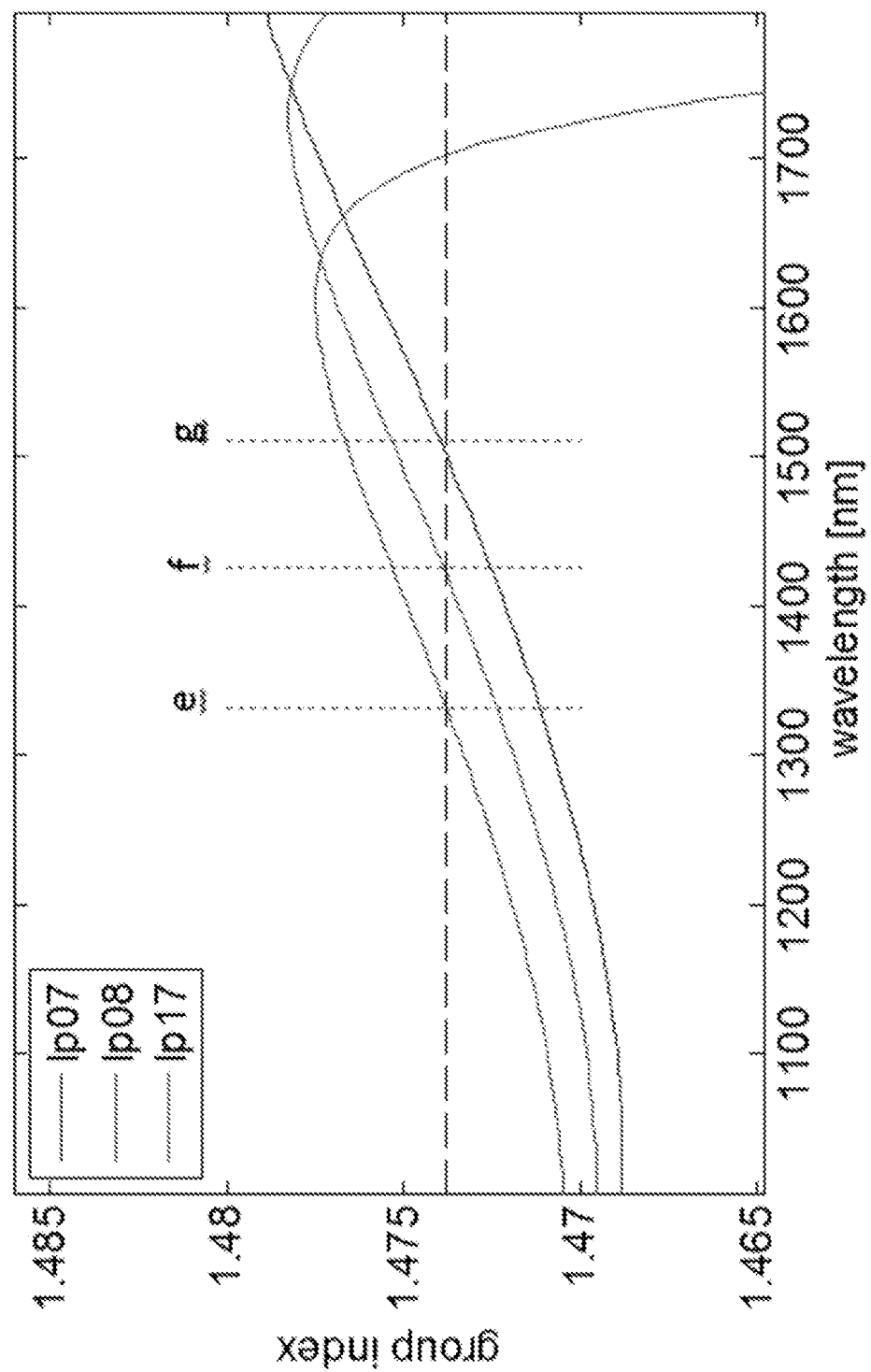
FIG. 36 presents plots of simulated group index showing that at least two or more modes at different wavelengths all have the same group velocity.

FIG. 36 presents plots of simulated group index showing that the $LP_{0,8}$ mode at ~1330 nm, the $LP_{1,7}$ mode at ~1420 nm and the $LP_{0,7}$ mode at ~1510 nm all have the same group velocity, and for this fiber these modes are separated by approximately 13 THz (peak of the Raman gain). As the intensity overlaps between these modes are non-zero, this is the cascaded process observed.

Figure 37:
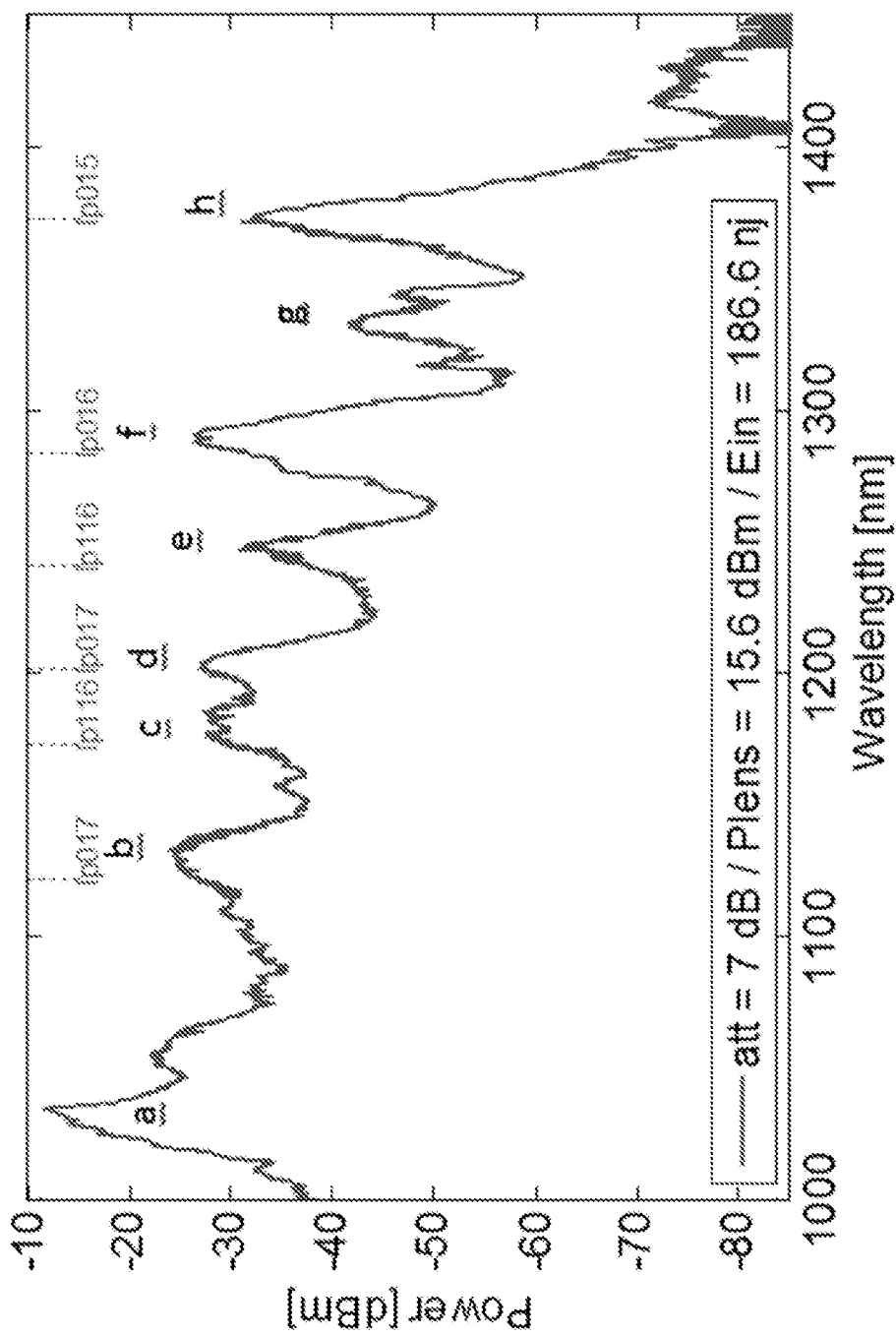
FIGS. 37 and 38 show measured output spectrum and simulated group index (respectively) from an example of two different intermodal Raman scattering processes taking place in a fiber.
Figure 38:
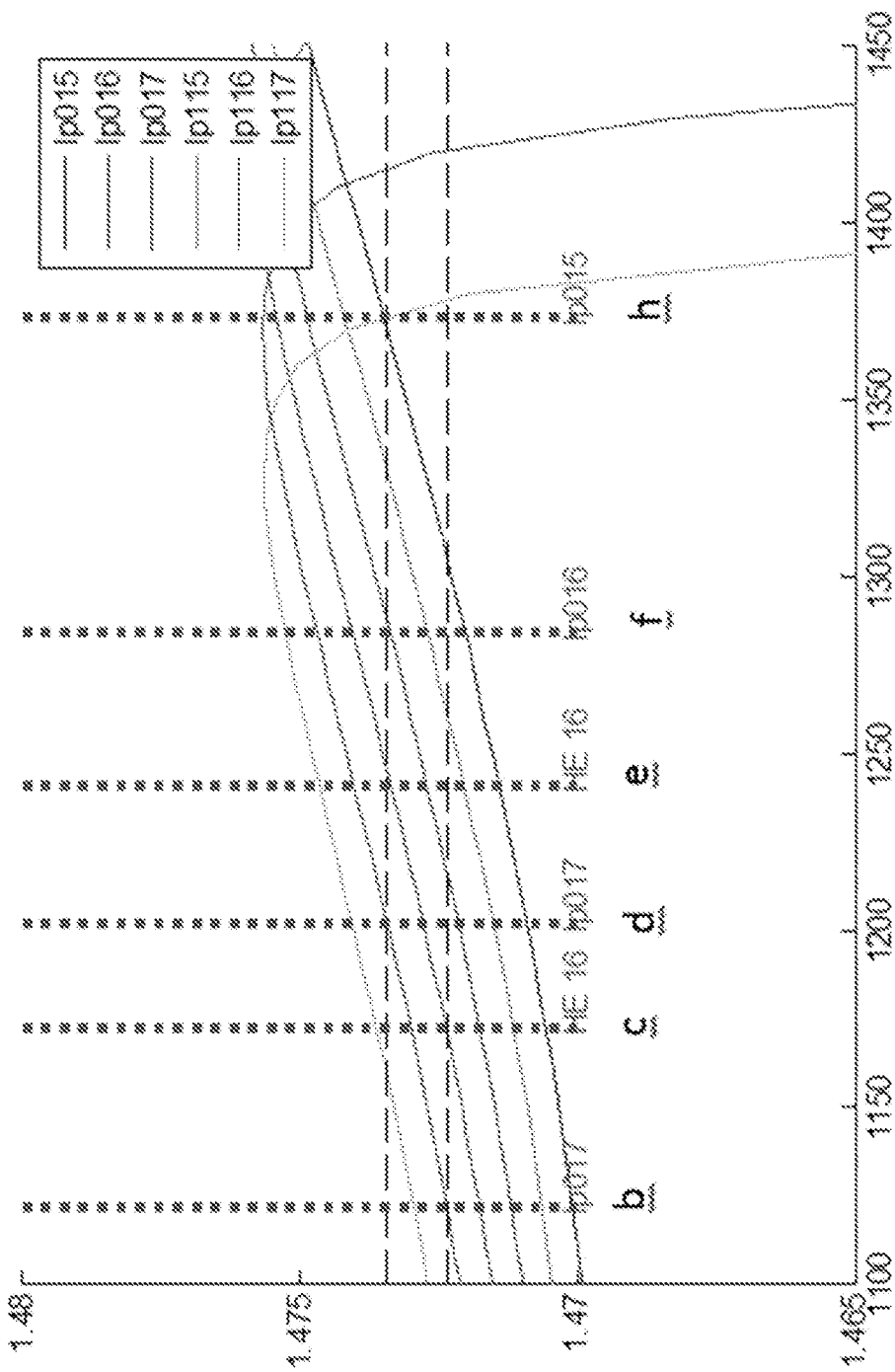

FIGS. 37 and 38 show measured output spectrum and simulated group index (respectively) from an example of two different cascaded processes taking place in the same fiber. The launched mode in this case is the $LP_{0,17}$ mode. The peaks marked as 'b' and 'c' have the same group index (the lower horizontal dashed line in FIG. 38), whereas the peaks marked by 'd', 'e', 'f', 'g', and 'h' all have the same group index (the upper horizontal dashed line in FIG. 38).

The above three examples illustrate an important point, namely that the cascaded process relies on group index matching between modes. This means that the process can be controlled by tailoring the group index of the modes via fiber design. This way it is possible to control the wavelength at which the process will take place, the modes between which it will occur, and, finally, the number of such cascaded processes that would be undergone. These three features put together speaks to a highly versatile system for creating ultrafast pulses at new colors, where the wavelength, number, and spacing of the newly created can be controlled by simple group index design in optical fibers. Also note that all the new pulses are formed in spatially coherent modes, as opposed to an uncontrolled mixture (superposition) of multiple modes. Our invention paves the path for an all-fiber monolithic architecture requiring no manual tuning or alignment, resistance to thermal, mechanical and other environmental perturbations, low weight, small footprint and potentially lower cost.

FIGS. 39-43 present several specific configurations of the general arrangement of FIG. 1 in greater detail along with their operation principles. As multimode fibers may support large numbers of modes (e.g., up to thousands), it is important to have the ability to excite just one or a few of the desired HOMs. In many cases the goal may be to excite a HOM in a fiber starting with a nearly Gaussian output from a pump laser. There are several different methods that can be utilized for this and these can be divided into sub-groups, which are described below with reference to FIGS. 39-43.

Figure 39:
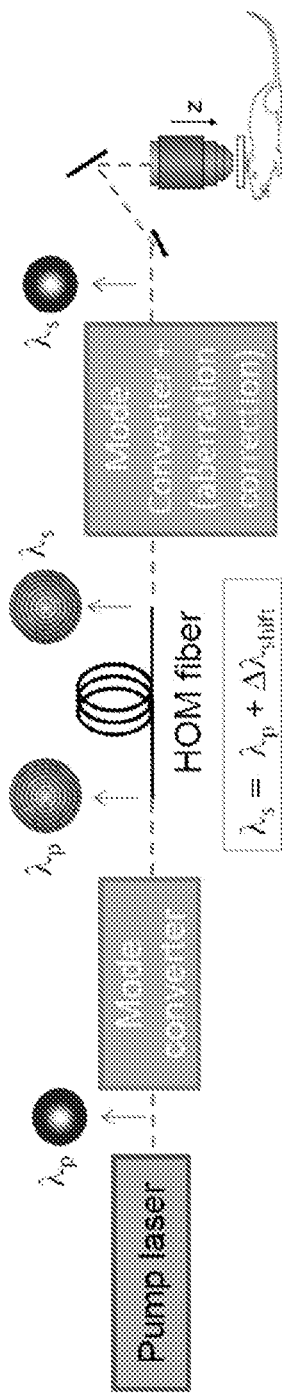
FIGS. 39-43 present several specific configurations of the general arrangement of FIG. 1.

FIG. 39 shows Free space mode excitation. The source-side mode converter is a free space element, which may be realized by a spatial light modulator (SLM), a Micro-Electro-Mechanical System (MEMS), a phase plate (e.g. binary phase plate), or axicon lens for example. In the fiber the nonlinear interaction takes place and light is converted to a desired wavelength. At the output of the fiber an additional mode conversion takes place using any of the aforementioned techniques, and the output could at the end for example be used for an imaging microscope, such as multiphoton microscope. In addition the mode conversion after the fiber could also take care of aberration corrections to improve the focus of light into the sample.

Figure 40:
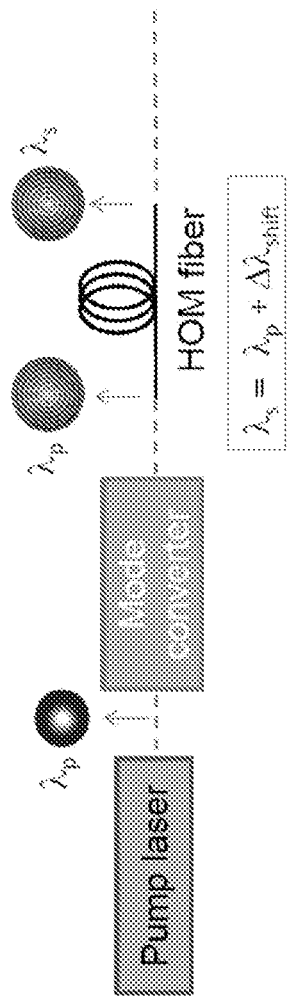

FIG. 40 shows an arrangement having No output conversion: In some cases, depending of the application of the laser it may also be desirable to not re-convert the output mode and instead use the HOMs directly out of the laser, since Bessel beams (which are the physical patterns the output HOMs resemble) also have useful applications such as in microscopy.

Figure 41:
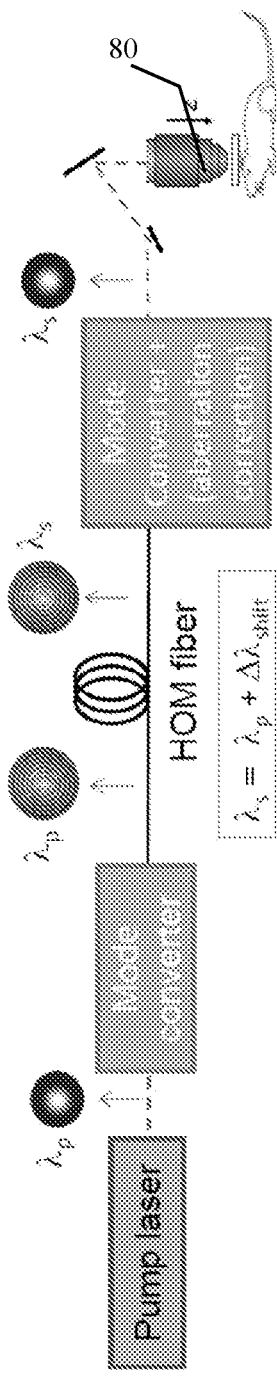

FIG. 41 shows Fiber facet mode excitation: The source-side mode converter is fabricated directly on the end facet of the fiber. Examples include a phase plate (e.g. binary phase plate) or axicon lens. In the fiber the nonlinear interaction takes place and light is converted to a desired wavelength. At the output of the fiber an additional mode conversion takes place using any of the aforementioned techniques.

Figure 42:
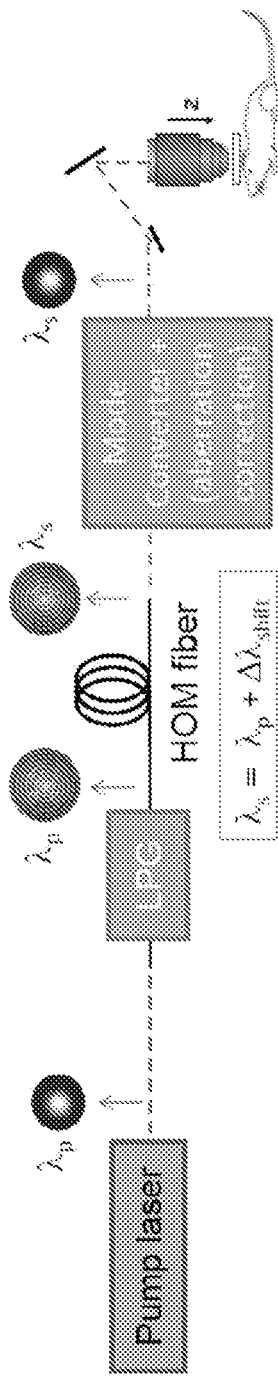

FIG. 42 shows Long period grating (LPG) mode excitation: The mode conversion takes place in the fiber using a long period grating (LPG). This could either be a UV-induced grating or an acoustic grating. In the fiber the nonlinear conversion takes place and light is converted to a desired wavelength. At the output of the fiber an additional mode conversion could takes place using either SLM, MEMS, axicon, phaseplates, the latter two either as free space elements or fabricated directly on the fiber facet.

Figure 43:
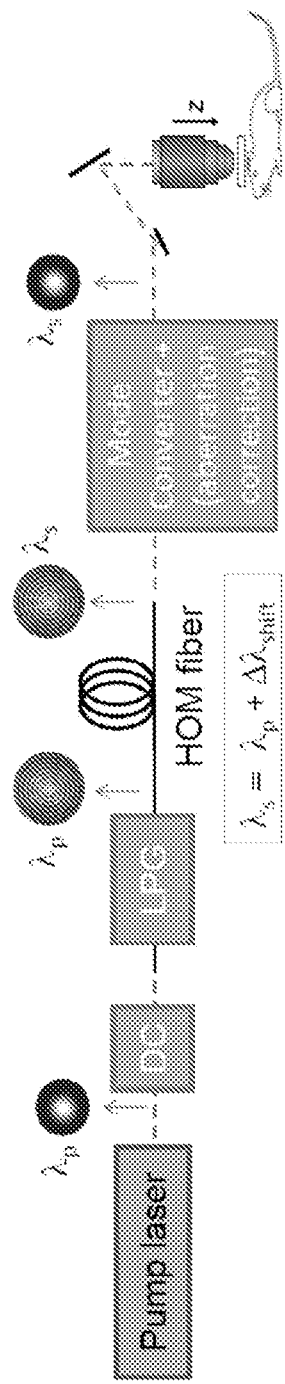

FIG. 43 shows Long period grating (LPG) mode excitation and dispersion control (DC): The mode conversion takes place in the fiber using a long period grating (LPG), with preceding dispersion control (DC), e.g. using a grating based pulse stretcher or alternatively a fiber based element. In the fiber the nonlinear interaction takes place and light is converted to a desired wavelength. At the output of the fiber an additional mode conversion could takes place using either SLM, MEMS, axicon, phaseplates, the latter two either as free space elements or fabricated directly on the fiber facet. Dispersion control may be desirable if a pre-chirped approach described below is employed.

Various approaches to mode conversion at the input or output, as depicted in FIGS. 39-43, include long period fiber gratings (LPG), acousto-optic fiber gratings, binary phase plates (BPP) or axicons. The operation of LPGs for the purposes of mode conversion is described in *S. Ramachandran, "Dispersion-tailored few-mode fibers: a versatile platform for in fiber photonic devices," J. Lightwave Tech.,* vol. 23, p. 3426, 2005, which is hereby incorporated by reference in its entirety. The operation of BPPs and axicons for the purposes of mode conversion is described in *J. Demas, L. Rishoj and S. Ramachandran, "Free-space beam shaping for precise control and conversion of modes in optical fiber," Opt. Exp.* vol. 23, p. 28531, 2015, which is hereby incorporated by reference in its entirety. Those skilled in the art will recognize that multiple other mode conversion technologies may be utilized to exploit the features described herein.

Pre-Chirped Pump Pulse

Besides using pump power or fiber length as a mean for wavelength control in the SSFS or intermodal Raman scattering process, an alternative approach is to pre-chirp the pulse, meaning broaden it in time but leave the spectral bandwidth unchanged. This is done by applying dispersion compensation before the HOM fiber, as shown in FIG. 43, where the dispersion compensation element is depicted as DC.

Figure 44:
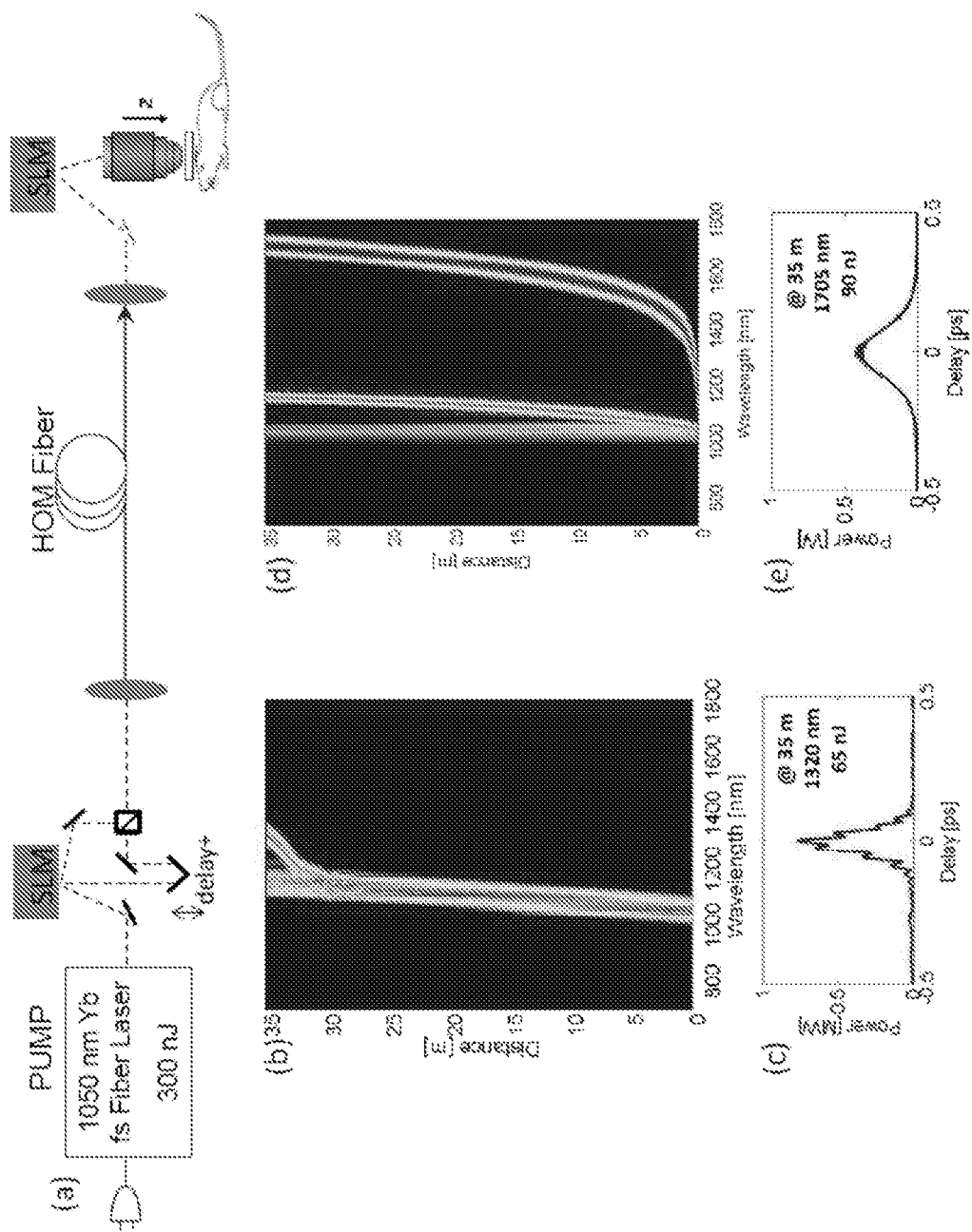
FIG. 44 shows a simulation result when a pre-chirp is such that a pulse initially compresses temporally as it propagates through a fiber.

FIG. 44 shows a simulation when the pre-chirp is such that the pulse compresses temporally as it propagates through the fiber in the anomalous dispersion mode. As seen in part (d), if an unchirped pulse is launched into this fiber, it splits into two solitons, and at the output of the fiber these have shifted to 1100 and 1700 nm, respectively. On the other hand for a chirped pulse, as seen in part (b), the pulse compresses in time while the spectral bandwidth remains nearly unchanged. Eventually, after about 32 m of propagation, the pulse has become so compressed that the peak power is high enough that the nonlinearity becomes a factor, producing a soliton. But since the effective length over which this soliton can now propagate in the fiber is reduced (since most of the time the pulse was only temporally compressing), the SSFS process only happens over a shorter effective length, leading to a smaller wavelength shift to about 1350 nm. Thus the degree of pre-chirp allows for continuous tuning from the 1050 nm pump wavelength all the way to 1700 nm. Even though dispersion and nonlinear effects to some extent always occur simultaneously, the aforementioned step-wise aspect of this process—namely, that a chirped pulse first undergoes temporal compression and then experiences nonlinear wavelength tuning (either via SSFS or cascade)—enables understanding how chirp may be used a wavelength tunability parameter. This is especially interesting because amount of dispersive chirp can easily be electronically (or robustly mechanically) controlled by a variety of dispersion control devices for ultra-short pulses.

Pulse Repetition Rate

Figure 45:
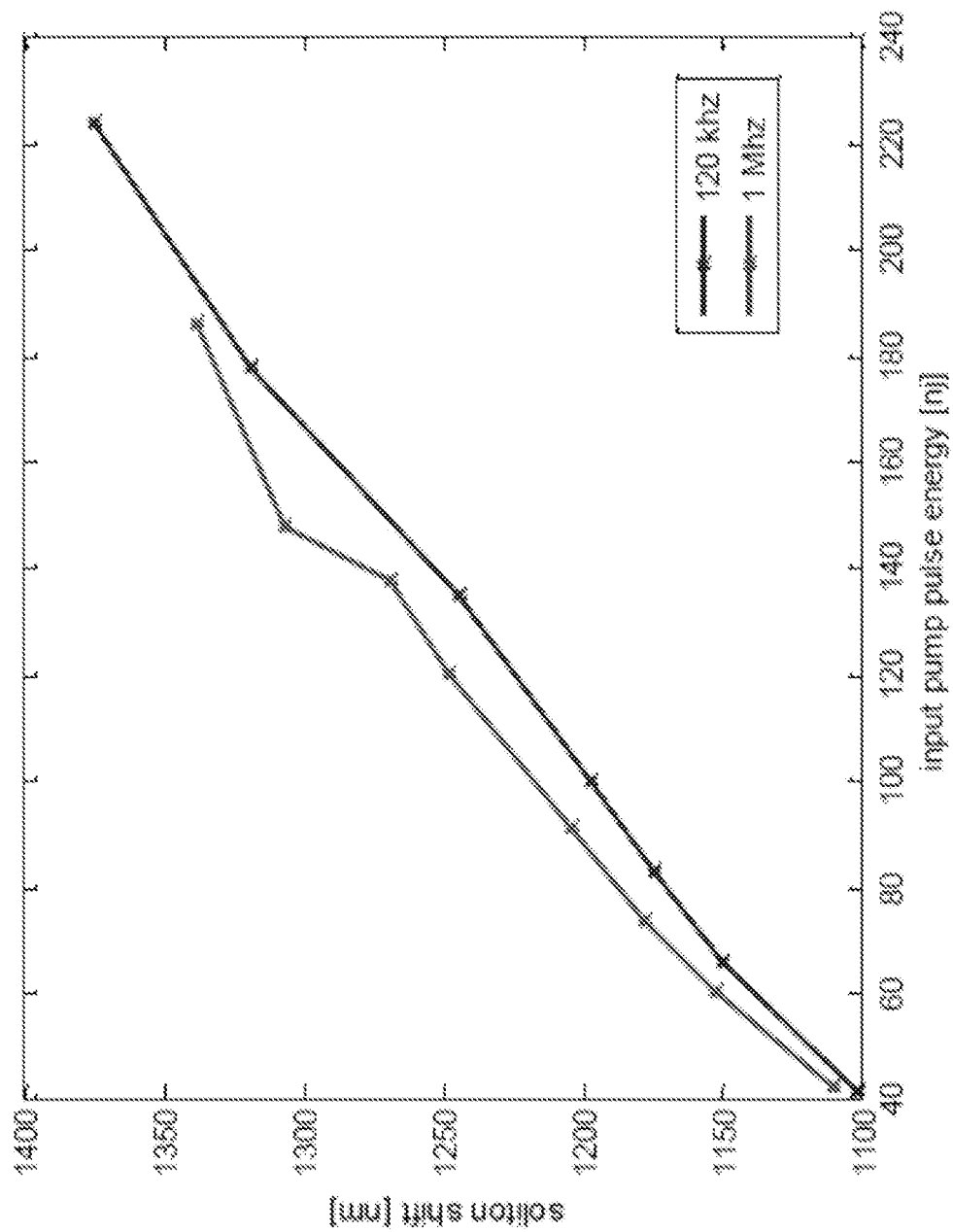
FIG. 45 confirms scalability of the processes with respect to pulse repetition rate.

FIG. 45 illustrates dynamics related to pulse repetition rate. For the above experiments the repetition rate of the laser is 120 kHz. However, as all nonlinear processes depend primarily on peak power, by changing the repetition rate of the laser the same spectra can be obtained provided that the individual pulses in the pulse trains are nominally similar in pulse shape, pulse width, bandwidth and pulse energy. FIG. 45 illustrates this for a soliton shifting experiment similar to the one described with reference to FIG. 19. Note that nearly the same wavelength shift is obtained using the same fiber sample regardless of whether the repetition rate of the pump laser is 120 kHz or 1 MHz, provided that the pulse energies of the individual pulses in the pulse trains are kept constant. The minor discrepancy seen in the shifted wavelength at the two repetition rates is related to a slight change in the pulse shape when changing the pulse repetition rate on the pump laser. Essentially, the processes described herein for producing wavelength tunable ultrashort pulses, either via SSFS (in an energy scalable fashion) or via intermodal Raman scattering (at low as well as high pulse energies) is independent of the repetition rate. Thus, these processes may be used for any repetition rate source that the pump laser possesses, or alternatively the system can be designed for any repetition rate needed by an application.

While various embodiments of the invention have been particularly shown and described, it will be understood by those skilled in the art that various changes in form and details may be made therein without departing from the scope of the invention as defined by the appended claims.

What is claimed is:

1. A fiber laser, comprising:
   a higher-order-mode (HOM) fiber having a step index and a guidance diameter together defining respective wavelength-dependent anomalous dispersion characteristics and effective areas greater than 100 square micrometers for corresponding higher-order modes of optical signal propagation in the HOM fiber, the higher-order modes including a predetermined higher-order mode with corresponding anomalous dispersion characteristic and effective area defining a first wavelength and first power of a pulse optical signal for conversion to a second wavelength and second power by soliton self-frequency shifting in the HOM fiber, the second wavelength and second power being related to the first wavelength and first power by the anomalous dispersion characteristic and effective area for the predetermined higher-order mode; and a source subsystem coupled to the HOM fiber to establish the pulse optical signal propagating in the HOM fiber in the predetermined higher-order mode;

wherein the pulse optical signal is a soliton having an energy $E_{sol}$ proportional to a dispersion value D and effective area $A_{eff}$ for the predetermined higher-order mode as well as to a difference $\Delta\lambda$ between the first and second wavelengths, and wherein the pulse optical signal has a peak power of one kilowatt or greater.

2. The fiber laser of claim 1, wherein the HOM fiber has a predetermined length selected to establish the second wavelength and second power based on corresponding predetermined values of the first power and first wavelength.

3. The fiber laser of claim 1, wherein fiber is sufficiently long to effect temporal narrowing of the optical pulse signal as it propagates in the fiber, by (1) the soliton shifting towards longer wavelengths for which the dispersion of the higher-order modes starts to decrease, and (2) the soliton reshaping itself to increase spectral bandwidth as a counter-action to the decreasing dispersion.

4. The fiber laser of claim 1, wherein the higher-order modes are linearly polarized (LP) modes.

5. The fiber laser of claim 4, wherein the HOM fiber has an index step that defines a guidance region of the higher-order modes.

6. The fiber laser of claim 5, wherein the HOM fiber contains one or more materials that transmit light in the wavelength range of 2 to 10 micrometers.

7. The fiber laser of claim 1, wherein the higher-order modes are orbital angular momentum (OAM) modes.

8. The fiber laser of claim 7, wherein the HOM fiber has a guidance region defined by a high index ring with a large index step at either an outer boundary or an inner boundary of the high index ring.

9. The fiber laser of claim 8, wherein the HOM fiber includes a central air region surrounded by a high-index doped region as the high index ring.

10. The fiber laser of claim 8, wherein the HOM fiber incorporates high index up- and down-dopants to realize the large index step.

11. The fiber laser of claim 1, wherein the HOM fiber includes either a ring of airholes or a low-index polymer jacket defining a guidance region.

12. The fiber laser of claim 1, wherein the source subsystem includes a free space element as a mode converter to establish the optical signal in the HOM fiber by free space mode excitation.

13. The fiber laser of claim 1, further including an output subsystem coupled to an output of the HOM fiber to receive and optically process the pulse optical signal having the second wavelength.

14. The fiber laser of claim 13, wherein the output subsystem includes a mode converter to convert the predetermined mode to a distinct desired mode for use in an application.

15. The fiber laser of claim 14, wherein the mode converter includes aberration correction to improve focus of light used in the application.

16. The fiber laser of claim 1, wherein the source subsystem further includes a dispersion control (DC) element to impart a pre-chirped characteristic to the pulse optical signal in the HOM fiber.

17. The fiber laser of claim 1, wherein the second wavelength is in a range selected from the ranges of 700-1000 nm, 1200-1400 nm, 1600-1800 nm, and 2-10 um.

18. A fiber laser, comprising:
a higher-order-mode (HOM) fiber having a step index and a guidance diameter together defining respective wavelength-dependent anomalous dispersion characteristics and effective areas for corresponding higher-order modes of optical signal propagation in the HOM fiber, the higher-order modes including predetermined first and second modes sharing a predetermined group index and group velocity at corresponding first and second wavelengths to define a first pulse optical signal having the first mode and first wavelength from which a second pulse optical signal of the second mode and second wavelength is produced by interpulse and intermodal Raman scattering; and a source subsystem coupled to the HOM fiber to establish the first optical signal propagating in the first mode to produce the second optical signal, wherein the effective areas of the higher-order modes are greater than 100 square micrometers, and wherein the first and second pulse optical signals each have a peak power of one kilowatt or greater.

19. The fiber laser of claim 18, wherein the first pulse optical signal is established in the HOM fiber by soliton self-frequency shifting of a pump signal having the first mode and a pump wavelength, and the source subsystem establishes the first optical signal by generating the pump signal and launching the pump signal into the HOM fiber.

20. The fiber laser of claim 18, wherein the higher-order modes include a third mode sharing the predetermined group index and group velocity at a third wavelength causing production of a third pulse optical signal of the third mode and third wavelength by the interpulse and intermodal Raman scattering.

21. The fiber laser of claim 18, wherein the second wavelength differs from the first wavelength by a predetermined wavelength difference corresponding to approximately a peak of Raman gain provided by the first optical signal.

22. The fiber laser of claim 21, wherein conversion from the first wavelength to the second wavelength occurs by a dominant Raman coupling process proportional to the product of an intensity overlap integral between the first and second modes and Raman gain experienced at the second wavelength due to the first optical pulse at the first wavelength.

23. The fiber laser of claim 22, wherein the HOM fiber has a fiber design effective to establish a +1 process as the dominant Raman coupling process, the +1 process coupling light energy among adjacent ones of a set of group-matched modes of successively greater wavelength.

24. The fiber laser of claim 22, wherein the HOM fiber has a fiber design effective to establish a +n cascade process as the dominant Raman coupling process, the +n cascade process coupling light energy among modes separated by n−1 intervening skipped modes in a set of group-matched modes of successively greater wavelengths.

25. The fiber laser of claim 24, wherein n is equal to 1, such that the +n cascade process is a +1 cascade process that couples light energy among adjacent modes of the set of group-matched modes.

26. The fiber laser of claim 24, wherein n is greater than 1, such that the +n cascade process couples light energy among non-adjacent modes of the set of group-matched modes.

27. The fiber laser of claim 24, wherein the set of group-matched modes have an inter-mode wavelength spacing corresponding to approximately a peak of Raman gain at the respective mode wavelengths.

28. The fiber laser of claim 22, wherein the dominant Raman coupling process is a process having a smallest effective Raman area weighted by a Raman gain coefficient.

29. The fiber laser of claim 18, wherein control of the first and second wavelengths is provided by a combination of power of the first optical signal and length of the HOM fiber.

* * * * *